US012811718B2

(12) United States Patent
Wong et al.

(10) Patent No.: US 12,811,718 B2
(45) Date of Patent: Nov. 24, 2026

(54) METHODS, COMMUNICATIONS DEVICES, AND INFRASTRUCTURE EQUIPMENT

(71) Applicant: Sony Group Corporation, Tokyo (JP)

(72) Inventors: Shin Horng Wong, Basingstoke (GB); Martin Warwick Beale, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 248 days.

(21) Appl. No.: 18/289,001

(22) PCT Filed: Mar. 29, 2022

(86) PCT No.: PCT/EP2022/058341

§ 371 (c)(1),
(2) Date: Oct. 31, 2023

(87) PCT Pub. No.: WO2022/238044

PCT Pub. Date: Nov. 17, 2022

(65) Prior Publication Data

US 2024/0223304 A1 Jul. 4, 2024

(30) Foreign Application Priority Data

May 10, 2021 (EP) .................................... 21173173

(51) Int. Cl.
*H04L 1/00* (2006.01)

(52) U.S. Cl.
CPC .................................. *H04L 1/0026* (2013.01)

(58) Field of Classification Search
CPC ... H04L 1/0026; H04L 5/0051; H04L 1/0029; H04L 1/16; H04W 72/23; H04W 24/10
See application file for complete search history.

(56) References Cited

U.S. PATENT DOCUMENTS 12,413,993 B2 * 9/2025 Elshafie ................ H04L 1/0036
2016/0174096 A1 * 6/2016 Khoshnevis .......... H04L 5/0048
370/252

(Continued)

FOREIGN PATENT DOCUMENTS

CN 106416106 A 2/2017
CN 110034906 A 7/2019

(Continued)

OTHER PUBLICATIONS

International Search Report and Written Opinion mailed on Aug. 5, 2022, received for PCT Application PCT/EP2022/058341, filed on Mar. 29, 2022, 11 pages.

(Continued)

*Primary Examiner* — Kan Yuen
(74) *Attorney, Agent, or Firm* — XSENSUS LLP

(57) ABSTRACT

A method comprising receiving, from a wireless communications network, an indication of one or more physical downlink shared channel, PDSCHs, to be received by a communications device from the wireless communications network via a radio access interface, receiving, from the wireless communications network, an indication of whether to report one or more quality report types, wherein each of the quality report types is associated with at least one of the PDSCHs, determining, for at least one of the quality report types, a transmission quality level with which the wireless communications network would need to transmit the associated PDSCHs such that the communications device would receive the associated PDSCHs at a target block error rate, BLER, and transmitting to the wireless communications network, for the at least one quality report type, an indication of the determined transmission quality levels.

19 Claims, 10 Drawing Sheets

(56) References Cited

U.S. PATENT DOCUMENTS

| | | | | |
|---|---|---|---|---|
| 2017/0070934 | A1* | 3/2017 | Luo | H04W 52/146 |
| 2017/0289825 | A1 | 10/2017 | Harrison | |
| 2019/0013911 | A1* | 1/2019 | Muruganathan | H04B 7/0452 |
| 2019/0394758 | A1* | 12/2019 | Cheng | H04W 24/08 |
| 2020/0007215 | A1* | 1/2020 | Lu | H04W 72/542 |
| 2020/0145077 | A1 | 5/2020 | Sarkis et al. | |
| 2020/0221456 | A1* | 7/2020 | Kwak | H04L 5/0053 |
| 2020/0259625 | A1 | 8/2020 | Papasakellariou | |
| 2021/0021316 | A1* | 1/2021 | Bai | H04B 7/0626 |
| 2022/0045783 | A1* | 2/2022 | Pedersen | H04W 24/10 |
| 2022/0070711 | A1* | 3/2022 | Elshafie | H04L 1/189 |
| 2022/0256387 | A1* | 8/2022 | Xiao | H04L 5/0037 |
| 2022/0287013 | A1* | 9/2022 | Farag | H04L 5/0035 |
| 2022/0322398 | A1* | 10/2022 | Tsai | H04L 1/1854 |
| 2023/0379026 | A1* | 11/2023 | Zhang | H04L 5/006 |

FOREIGN PATENT DOCUMENTS

| | | | |
|---|---|---|---|
| WO | WO-2018064182 | A1 | 4/2018 |
| WO | WO-2021055359 | A1 | 3/2021 |
| WO | 2022/018230 | A1 | 1/2022 |

OTHER PUBLICATIONS

Nokia et al., "Revised WID: Enhanced Industrial Internet of Things (IoT) and ultra-reliable and low latency communication (URLLC) support for NR", 3GPP TSG RAN Meeting #88e, RP-201310, Jun. 29-Jul. 3, 2020, 6 pages.

Moderator (Interdigital, Inc.), "Feature lead summary #4 on CSI feedback enhancements for enhanced URLLC/IIoT", 3GPP TSG RAN WG1 #104b-e, R1-2103956, Apr. 12-20, 2021, 64 pages.

Holma et al., "LTE for UMTS OFDMA and SC-FDMA Based Radio Access", John Wiley & Sons, 2009, 450 pages.

Mediatek Inc., "On CQI and MCS Design for URLLC", 3GPP TSG RAN WG1 Meeting #93, R1-1806804, May 21-25, 2018, 5 pages.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

3GPP, "Study on Scenarios and Requirements for Next Generation Access Technologies; (Release 14)", 3GPP TR 38.913 V14.3.0, Jun. 2017, pp. 1-39.

Samsung, "CSI Report Enhancements for URLLC." 3GPP TSG RAN WG1 #104b-e, Agenda Item 8.3.1.2, contribution R1-2103237, Apr. 2021, 8 pgs., www.3gpp.org. Accessed Feb. 3, 2026.

* cited by examiner

METHODS, COMMUNICATIONS DEVICES, AND INFRASTRUCTURE EQUIPMENT

CROSS-REFERENCE TO RELATED APPLICATIONS

The present application is based on PCT filing PCT/EP2022/058341, filed Mar. 29, 2022, which claims priority from European Patent Application No. 21173173.2, filed May 10, 2021, the contents of each are hereby incorporated by reference.

BACKGROUND

Field of Disclosure

The present disclosure relates to communications devices, infrastructure equipment and methods for the efficient reception of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever-increasing range of devices associated with a wider range of data traffic profiles and types than existing systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device configured to transmit signals to and/or to receive signals from a wireless communications network via a wireless radio interface provided by the wireless communications network. The method comprises receiving, from the wireless communications network, an indication of one or more physical downlink shared channel, PDSCHs, to be received by the communications device from the wireless communications network via the radio access interface, receiving, from the wireless communications network, an indication of whether to report one or more quality report types, wherein each of the quality report types is associated with at least one of the PDSCHs, determining, for at least one of the quality report types, a transmission quality level with which the wireless communications network would need to transmit the associated PDSCHs such that the communications device would receive the associated PDSCHs at a target block error rate, BLER, and transmitting to the wireless communications network, for the at least one quality report type, an indication of the determined transmission quality levels.

Embodiments of the present technique, which, in addition to methods of operating communications devices, relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
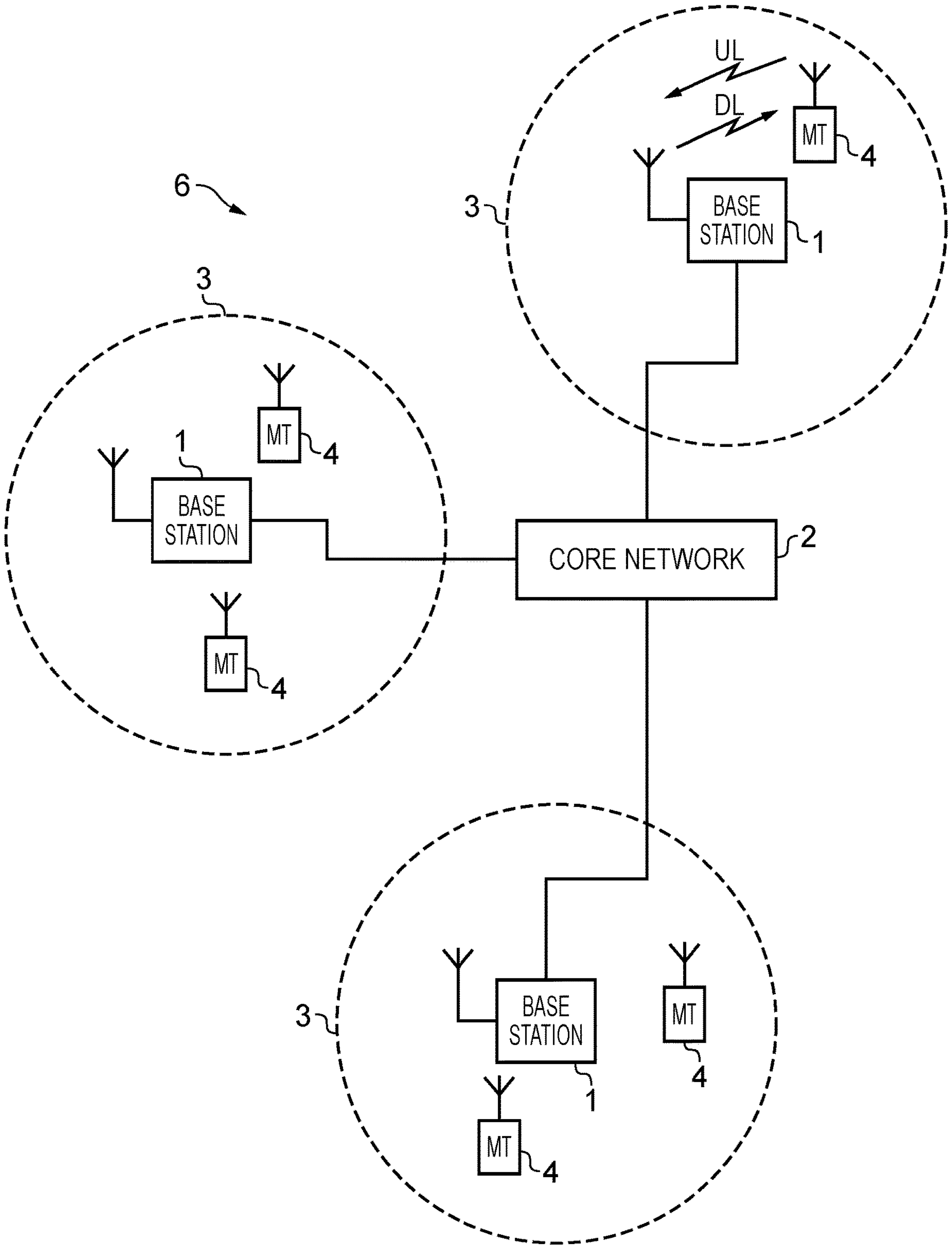
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
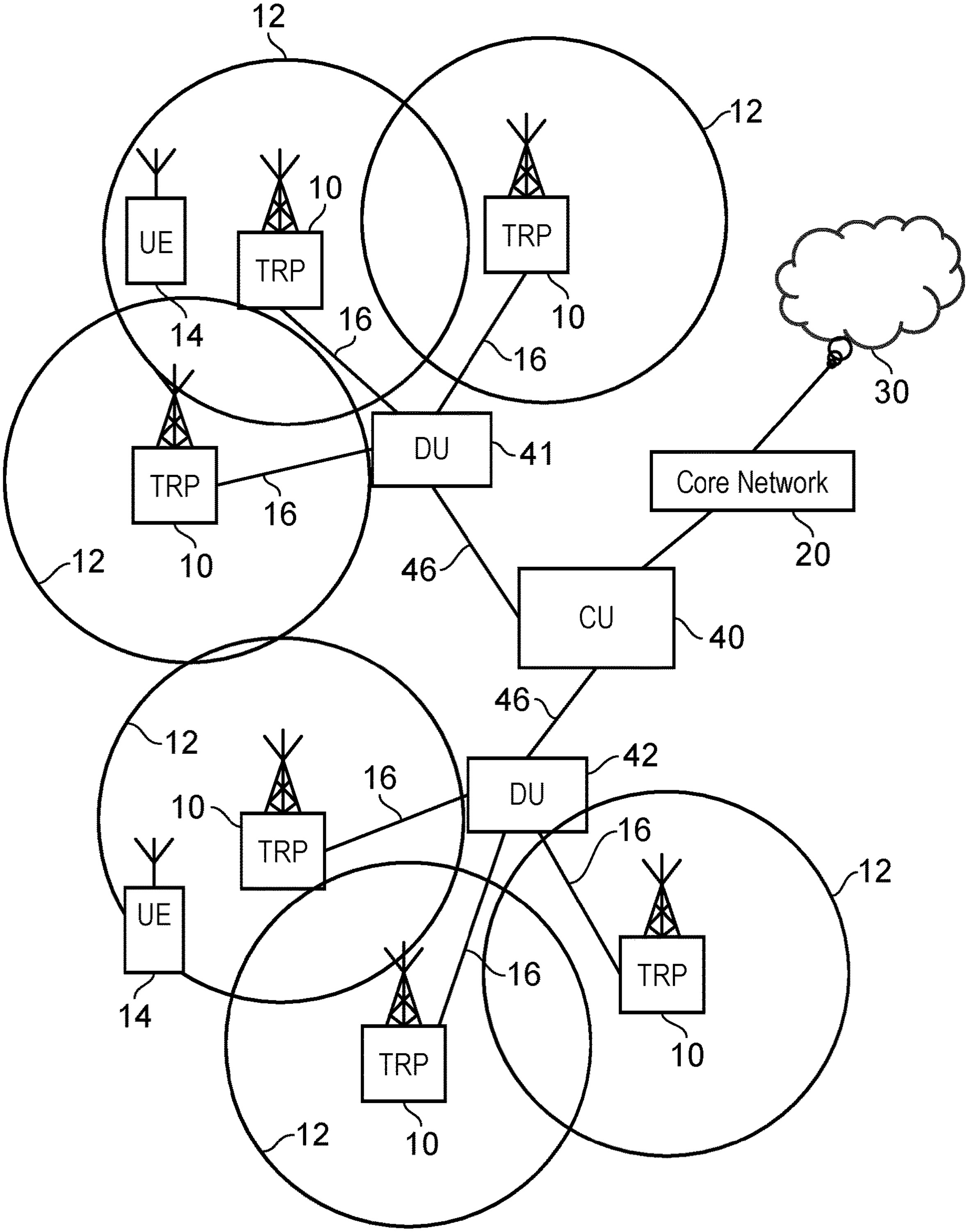
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
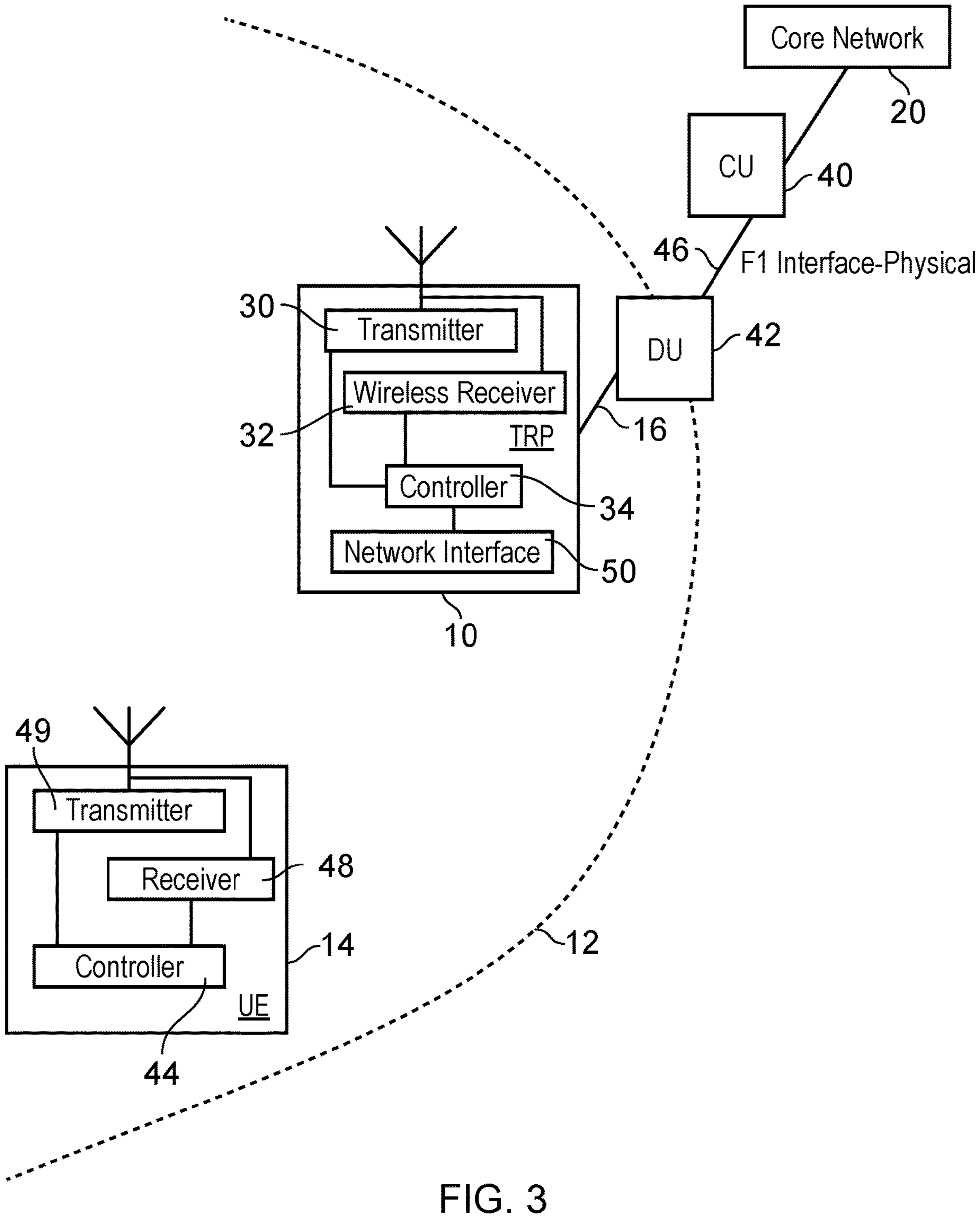
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 45, a receiver 48 and a controller 44 which is configured to control the transmitter 45 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 45 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 47 which connects to the DU 42 via a physical interface 16. The network interface 47 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 47 of the TRP10 to the DU 42 and the F1 interface 46 from the DU 42 to the CU 40.

eURLLC and eMBB

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s, with moderate latency and reliability requirements (e.g. 99% to 99.9%). The requirements for Ultra Reliable and Low Latency Communications (URLLC) services on the other hand are for one transmission of a 32 byte packet to be transmitted from the radio protocol layer 2/3 SDU ingress point to the radio protocol layer 2/3 SDU egress point of the radio interface within 1 ms with a reliability of $1\text{-}10^{-5}$ (99.999%) or higher (99.9999%) [2].

Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] specifies features that require high reliability and low latency, such as factory automation, transport industry, electrical power distribution, etc. in a 5G system. eURLLC is further enhanced as IIoT-URLLC [4], for which one of the objectives is to enhance CSI reporting by introducing new CSI reports for downlink measurements in URLLC.

PDSCH HARQ-ACK Feedback

In a Dynamic Grant Physical Downlink Shared Channel (DG-PDSCH), the PDSCH resource is dynamically indicated by the gNB using a DL Grant carried by Downlink Control Information (DCI) in a Physical Downlink Control Channel (PDCCH).

A PDSCH is transmitted using HARQ transmission, where for a PDSCH ending in slot n, the corresponding Physical Uplink Control Channel (PUCCH) carrying the HARQ-ACK is transmitted in slot $n+K_1$. Here, in Dynamic Grant PDSCH, the value of $K_1$ is indicated in the field "PDSCH-to-HARQ_feedback timing indicator" of the DL Grant (carried by DCI Format 1_0, DCI Format 1_1 or DCI Format 1_2). Multiple (different) PDSCHs can point to the same slot for transmission of their respective HARQ-ACKs, and these HARQ-ACKs (in the same slot) are multiplexed into a single PUCCH. Hence, a PUCCH can contain multiple HARQ-ACKs for multiple PDSCHs.

Semi-Persistent Scheduling (SPS)

As is well understood by those skilled in the art, a gNB uses a PDSCH for downlink data transmission to a UE. The PDSCH resources used for the transmission of the PDSCH can be scheduled by a gNB either dynamically, or through the allocation of Semi-Persistent Scheduling (SPS) resources.

Similarly to the use of Configured Grants (CGs) in the uplink, the use of SPS in the downlink reduces latency, particularly for regular and periodic traffic. The gNB is required to explicitly activate and deactivate SPS resources when it determines they may be required. These SPS resources are typically configured via Radio Resource Control (RRC) signalling, and occur periodically where each SPS PDSCH occasion has a pre-configured and fixed duration. This allows the gNB to schedule traffic that has a known periodicity and packet size. The gNB may or may not transmit any PDSCH in any given SPS PDSCH occasion, and so the UE is required to monitor each SPS PDSCH occasion for a potential PDSCH transmission.

In Rel-15 the UE can only be configured with one SPS PDSCH and this SPS PDSCH is activated using an activation DCI (Format 10 or 1_1) with the Cyclic Redundancy Check (CRC) scrambled with a Configured Scheduling Radio Network Temporary Identifier (CS-RNTI). Once an SPS PDSCH is activated, the UE will monitor for a potential PDSCH in each SPS PDSCH occasion of the SPS PDSCH configuration without the need for any DL Grant until the SPS PDSCH is deactivated. Deactivation of the SPS PDSCH is indicated via a deactivation DCI scrambled with CS-RNTI. The UE provides a HARQ-ACK feedback for the deactivation DCI, but no HARQ-ACK feedback is provided for an activation DCI.

Similar to DG-PDSCH, the slot containing the PUCCH resource for HARQ-ACK corresponding to SPS PDSCH is indicated using the $K_1$ value in the field "PDSCH-to-HARQ_feedback timing indicator" of the activation DCI. Since a dynamic grant is not used for SPS PDSCH, this $K_1$ value is applied for every SPS PDSCH occasion, and can only be updated after it has been deactivated and re-activated using another activation DCI with a different $K_1$ value.

Since there is only one SPS PDSCH, PUCCH Format 0 or 1 is used to carry the HARQ-ACK feedback. If the PUCCH collides with a PUCCH carrying HARQ-ACK feedback for a DG-PDSCH, the HARQ-ACK for SPS PDSCH is multiplexed into the PUCCH corresponding to the DG-PDSCH.

In Rel-16 the UE can be configured with up to eight SPS PDSCHs, where each SPS PDSCH has an SPS Configuration Index that is RRC configured. Each SPS PDSCH is individually activated using a DCI (Format 1_0, 1_1 & 1_2) with the CRC scrambled with CS-RNTI, where the DCI indicates the SPS Configuration Index of the SPS PDSCH to be activated. However, multiple SPS PDSCHs can be deactivated using a single deactivation DCI. Similar to Rel-15, the UE provides a HARQ-ACK feedback for the deactivation DCI, but does not provide one for the activation DCI.

The slot or sub-slot containing the PUCCH resource for HARQ-ACK feedback corresponding to an SPS PDSCH occasion is determined using the $K_1$ value indicated in the activation DCI. Since each SPS PDSCH configuration is individually activated, different SPS PDSCH can be indicated with different K values.

Channel State Information (CSI) Report

In NR, a link adaptation scheme (i.e. adaptive modulation and coding (AMC)) with various modulation schemes and channel coding rates is applied to the PDSCH. For channel state estimation purposes, the UE may be configured to measure Channel State Information Reference Signals (CSI-RS) and/or CSI Interference Measurement (CSI-IM) signals, and to estimate the downlink channel state based on the CSI-RS/CSI-IM measurements. The UE then feeds the estimated channel state back to the gNB to be used in link adaptation.

In legacy systems, the CSI reported can be configured to be periodic, aperiodic, or semi-persistent. Periodic CSI (P-CSI) is transmitted using PUCCHs, where the CSI report is sent periodically. In addition, the periodic CSI can be also transmitted using a Physical Uplink Shared Channel (PUSCH) when the PUSCH to transmit UL-SCH is scheduled at the same time as the PUCCH. Aperiodic CSI (A-CSI) is transmitted using PUSCHs and is triggered by a CSI Request field in the UL Grant, where only a single CSI report is sent. In Semi-persistent CSI (SP-CSI), the CSI report is sent periodically once it is activated by DCI or Medium Access Control (MAC) Control Element (CE) signalling and is stopped when deactivated by DCI or MAC CE signalling. Semi-persistent CSI reports can be configured to be transmitted on PUSCH or PUCCH, where semi-persistent CSI on PUSCH is activated and deactivated by DCI whilst semi-persistent CSI on PUCCH is activated and deactivated by MAC CE.

The CSI can contain any or all of a Precoding Matrix Indicator (PMI), Rank Indicator (RI), Layer Indicator (LI), CSI-RS Resource indicator (CRI), Synchronisation Signal/ Physical Broadcast Channel (SS/PBCH) Block Resource indicator (SSBRI) and Channel Quality Indicator (CQI). CQI is used to help the gNB in Modulation and Coding Scheme (MCS) selection, and may be measured on the basis of a signal-to-noise ratio (SNR) or signal-to-interference plus noise-ratio (SINR) or the like.

3GPP has agreed to study new quality reporting, such as enhancements to CSI, for URLLC in Rel-17. One of the proposed quality reports is for the UE to report a delta of CQI/MCS [5], where the difference in CQI/MCS between the decoded or scheduled PDSCH and the CQI/MCS required to achieve a target BLER (e.g. $10^{-5}$) is determined by the UE and reported to the network. The delta CQI/MCS reports are proposed to help the gNB to make accurate scheduling decisions on the MCS required for the PDSCH. However, any details of this new quality report have not been discussed yet.

Figure 4:
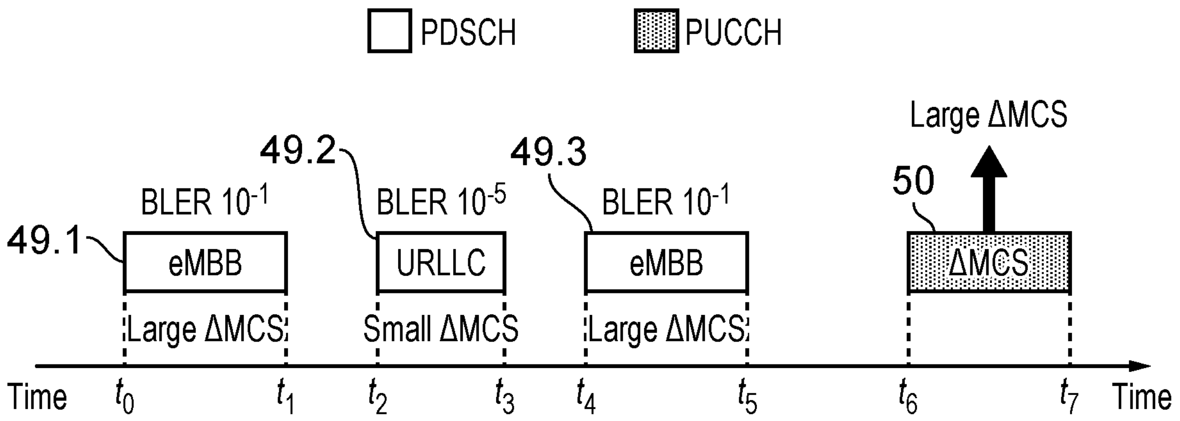
FIG. 4 illustrates a challenge of providing a quality report for a group of Physical Downlink Shared Channels carrying data of mixed traffic types.

Furthermore, an operational issue with this reporting scheme has been identified. Specifically, a UE may be scheduled with more than one type of traffic, e.g. eMBB and URLLC, where each traffic type has a different target BLER. This can lead to difficulty in interpreting the reported delta CQI/MCS. This is explained in an example in FIG. 4, where the UE receives three PDSCH where two of them 49.1, 49.3 contain eMBB packets and one 49.2 contains a URLLC packet. URLLC and eMBB have target BLERs of $10^{-5}$ and $10^{-1}$ respectively. If the gNB configures the UE to report a delta MCS (ΔMCS) for a target BLER of $10^{-5}$ for URLLC, the UE in this case would determine a large ΔMCS for PDSCHs 49.1, 49.3 which carry eMBB and which would be scheduled with a high MCS targeting $10^{-1}$ BLER and would determine a small ΔMCS for PDSCH 49.2 which carries URLLC traffic and which would be scheduled with a low MCS targeting $10^{-5}$ BLER. The value of ΔMCS 50 that is reported in the PUCCH may be an average of the ΔMCS values that were derived from PDSCH 49.1, 49.2, 49.3; however this would not be an accurate reflection of the performance of the MCS selection at the gNB. For example, if the averaging function resulted in a large ΔMCS 50 being reported, the gNB would determine that the MCS that was chosen for PDSCH 49.2 was too high, whereas the actual meaning of the large ΔMCS 50 is that a lower MCS would need to be applied to the eMBB PDSCH 49.1, 49.3, in order to achieve a BLER of $10^{-5}$. There is therefore a need to improve the determination and/or the ability to interpret the ΔMCS value. Embodiments of the present disclosure provide solutions to overcome at least this issue, as well as providing details of how proposed quality reporting such as that proposed in [5] may be implemented.

Quality Reporting Based on Downlink Message Decoding

Figure 5:
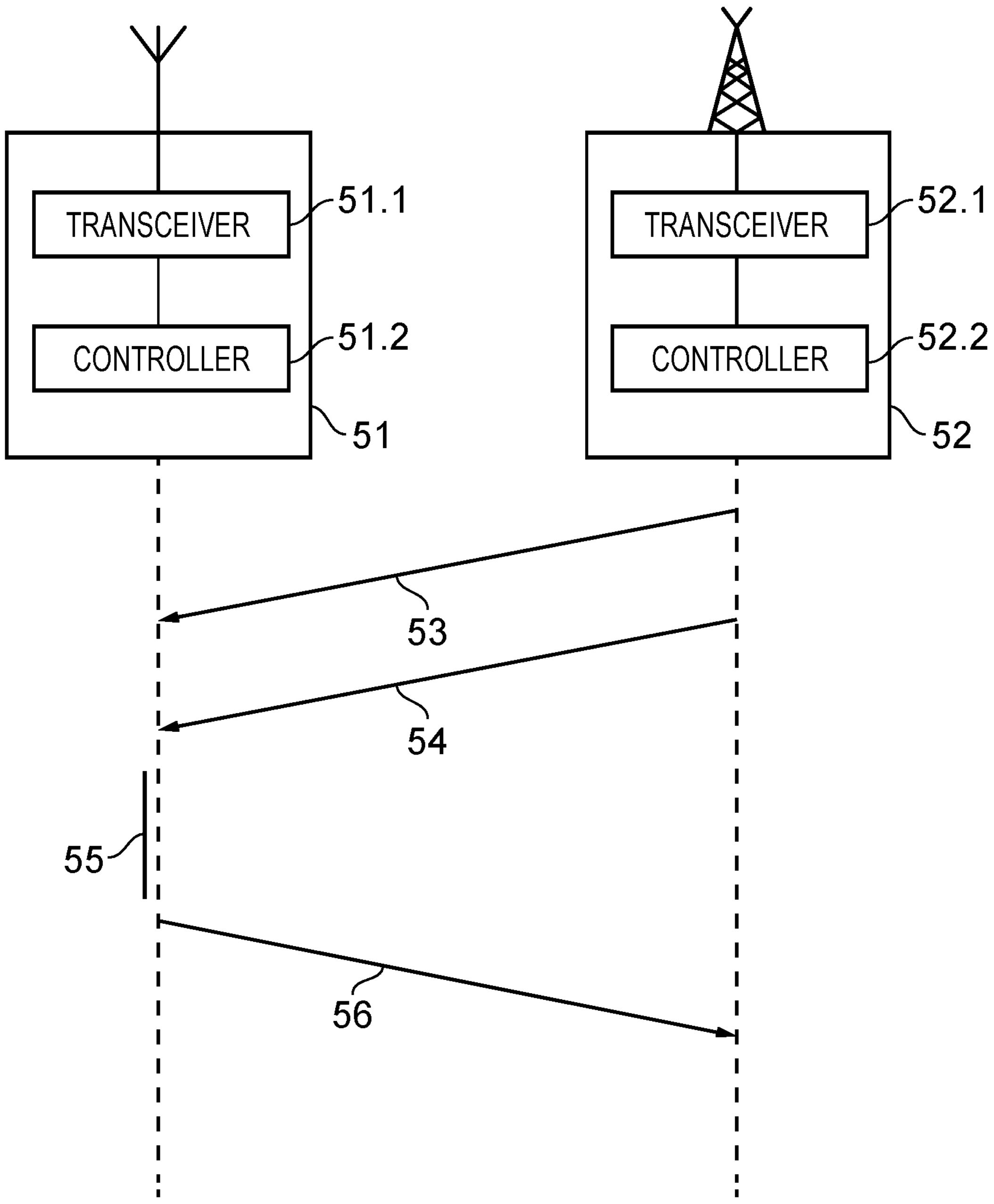
FIG. 5 shows a part schematic, part message flow diagram representation of a wireless communications system comprising a communications device and an infrastructure equipment in accordance with embodiments of the present technique.

FIG. 5 shows a part schematic, part message flow diagram representation of a first wireless communications system comprising a communications device 51 and an infrastructure equipment 52 in accordance with at least some embodiments of the present technique. The communications device 51 is configured to transmit signals to and/or receive signals from the wireless communications network, for example, to and from the infrastructure equipment 52. Specifically, the communications device 51 may be configured to transmit data to and/or receive data from the wireless communications network (e.g. to/from the infrastructure equipment 52) via a wireless radio interface provided by the wireless communications network (e.g. the Uu interface between the communications device 51 and the Radio Access Network (RAN), which includes the infrastructure equipment 52). The communications device 51 and the infrastructure equipment 52 each comprise a transceiver (or transceiver circuitry) 51.1, 52.1, and a controller (or controller circuitry) 51.2, 52.2. Each of the controllers 51.2, 52.2 may be, for example, a microprocessor, a CPU, or a dedicated chipset, etc.

As shown in the example of FIG. 5, the transceiver circuitry 51.1 and the controller circuitry 51.2 of the communications device 51 are configured in combination to receive 53, from the wireless communications network (e.g. from the infrastructure equipment 52), an indication of one or more physical downlink shared channel, PDSCHs, to be received by the communications device 51 from the wireless communications network (e.g. from the infrastructure equipment 52) via the radio access interface, to receive 54, from the wireless communications network (e.g. from the infrastructure equipment 52), an indication of whether to report one or more quality report types, wherein each of the quality report types is associated with at least one of the PDSCHs, to determine 55, for at least one of the quality report types, a transmission quality level with which the wireless communications network (e.g. the infrastructure equipment 52) would need to transmit the associated PDSCHs (i.e. the one or more PDSCHs that are associated with that quality report type) such that the communications device 51 would receive the associated PDSCHs (i.e. the one or more PDSCHs that are associated with that quality report type) at a target block error rate (BLER) (where this target BLER may form part of the quality report type/quality report configuration, which in addition to the target BLER may also indicate the type of transmission quality level to the communications device 51), and to transmit 56 to the wireless communications network (e.g. to the infrastructure equipment 52), for the at least one quality report type, an indication of the determined transmission quality levels.

Thus, each of the transmission quality levels are associated with a target BLER and, by extension, the one or more (associated) PDSCHs. The target BLER of the transmission quality level and the target BLER of the data type carried by the PDSCHs can be indicated to be different or the same. In other words, it may be that the associated PDSCHs are to carry data of a type associated with the target BLER used by the communications device to determine the transmission quality level for the at least one quality report type, or alternatively, it may be that the associated PDSCHs are to carry data of a type associated with a different target BLER to the target BLER used by the communications device to determine the transmission quality level for the at least one quality report type.

Here, the target BLER is the BLER with which a UE (such as communications device 51) is to receive data of a particular type (which may be—but is not limited to—URLLC or eMBB) in order to meet the requirements of that traffic type. For example, as described above, the target BLER for URLLC is $10^{-5}$ while the target BLER for eMBB, which has a lower reliability requirement than URLLC, is $10^{-1}$. Those skilled in the art would appreciate that the use of BLER as a target quality level is not essential, and that any other conceivable target quality levels may be used instead as appropriate. Furthermore, as mentioned above, this target BLER may be the same as or different to a target BLER of the data actually carried by the associated PDSCHs. For example, the gNB (such as infrastructure equipment 52) may be transmitting almost exclusively packets of a particular type (e.g. eMBB) for a certain time, but would like to know what MCS would be required to achieve the target BLER for URLLC data, so that it would be ready (or would at least have a good idea how) to transmit such URLLC data when any such packets arrive for transmission to the UE.

The indicated transmission quality level is also referred to herein as a quality report, and may be for example be CQI or MCS, or any other type of appropriate presently used or future quality report/transmission quality level. The transmission quality level may also be indicated in any appropriate way; while arrangements of embodiments of the present technique primarily refer to a delta transmission quality level (e.g. ΔMCS or ΔCQI), the transmission quality level may alternatively be indicated explicitly. In other words, the indication of the determined transmission quality levels may indicate each of the determined transmission quality levels as a difference value indicating a difference between the each of the determined transmission quality level (i.e. that is determined based on the target BLER associated with the quality report type) and a scheduled quality level of the associated PDSCHs (i.e. the target BLER for which they have been scheduled by the gNB to be transmitted), or alternatively, the indication of the determined transmission quality levels may directly indicate the values of the determined transmission quality levels. The type of transmission quality level to use (e.g. CQI or MCS) and/or whether this should be indicated directly or as a delta value is indicated to the UE by (or known by the UE with reference to) the indicated quality report type, which can also be understood as a quality report configuration. This quality report type/configuration may also indicate the target BLER to be used for determination by the UE of the transmission quality level(s).

As described in more detail below, arrangements of embodiments of the present disclosure describe how a UE (such as communications device 51) may be configured with a single quality report (i.e. the network signals a single target BLER for a single data type) or multiple quality reports (i.e. the network signals multiple target BLER for multiple data types; e.g. one target BLER for eMBB and one target BLER for URLLC). Furthermore, the PDSCH(s) associated with each quality report may be individual PDSCHs, a set of two or more PDSCHs, or a mixture of individual or a set of PDSCHs depending on the quality report (i.e. the target BLER), and the data carried by these PDSCHs may or may not relate to the target BLER(s) associated with the quality report(s)/quality report type(s).

Essentially, embodiments of the present technique propose that a quality report is to be associated with an identified PDSCH or a set of PDSCHs. This identified PDSCH or set of PDSCHs is indicated by the gNB. Thus, in accordance with embodiments of the present disclosure described and claimed herein, quality reporting is based on actual scheduled PDSCHs, and a number of different implementations and arrangements of such quality reporting are proposed unlike in proposed techniques such as in [5]. Furthermore, embodiments of the present disclosure are able to handle quality reporting for mixed traffic types, which is not currently know in the art. Thus, through employment of embodiments of the present technique, link adaptation schemes are able to better cope with mixed traffic types and, as a result, enable wireless communications networks to operate more efficiently.

In some arrangements of embodiments of the present disclosure, the UE (e.g. communications device 51) may simply, through the indication 54 of the quality report type(s)/configuration(s), be provided with a target BLER, and is to apply this for a set number of PDSCHs, a set period, or until it receives a new quality report type/configuration or an indication that it should stop applying the current target BLER. This may be done on a per-PDSCH basis or for multiple PDSCHs as discussed in more detail with respect to some embodiments of the present disclosure below. Hence, the UE is simply told which target BLER to use, rather than CQI/MCS reports being turned on/off by the gNB for different PDSCHs. Here, the type of transmission quality level (e.g. ΔCQI) may also be indicated in the quality report configuration/type.

The quality report can be used by the gNB for more accurate MCS selection in scheduling the PDSCH. It should be noted that the gNB may request a quality report with a target BLER for the transmission quality level that is different to the target BLER of the data type carried by the one or more PDSCHs. As mentioned above, this may be beneficial in a scenario where the data type with low target BLER such as URLLC, arrives infrequently whereas the data type with high target BLER such as eMBB arrives more frequently. The gNB can then request a quality report based on a low target BLER, e.g. URLLC, from a PDSCH with a high target BLER data type, e.g. eMBB, so that it can estimate the transmission quality level (e.g. MCS) of an upcoming low BLER data type, e.g. URLLC, from the scheduled high BLER data type, e.g. eMBB, PDSCHs.

Figure 6:
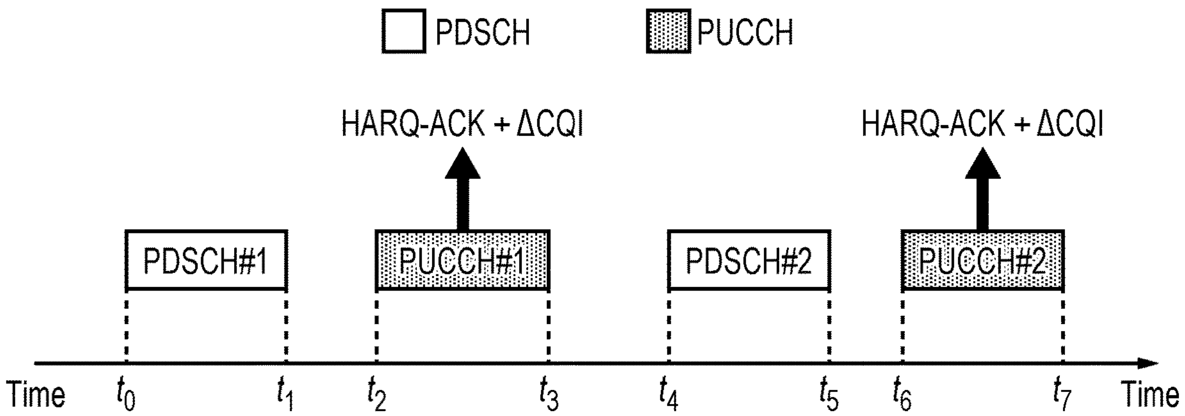
FIG. 6 shows an example of providing a quality report per PDSCH in individual Physical Uplink Control Channels (PUCCHs) in accordance with embodiments of the present disclosure.
Figure 7:
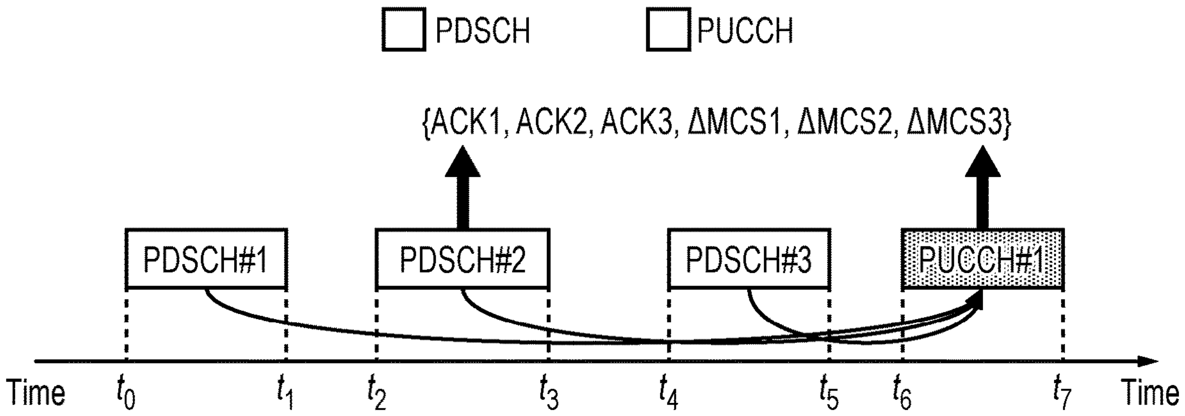
FIG. 7 shows an example of providing a quality report per PDSCH multiplexed into a single PUCCH in accordance with embodiments of the present technique.

As mentioned above, in some arrangements of embodiments of the present disclosure, a quality report is on a per-scheduled PDSCH basis. Here, the quality report can be transmitted together with the HARQ-ACK feedback in the same PUCCH/PUSCH or transmitted separately from the HARQ-ACK feedback in a different PUCCH/PUSCH. An example is shown in FIG. 6, where the quality report is ΔCQI. The HARQ-ACK feedbacks for PDSCH #1 and PDSCH #2 are scheduled to be transmitted in PUCCH #1 and PUCCH #2 respectively. Here the ΔCQI for PDSCH #1 and PDSCH #2 are transmitted in PUCCH #1 and PUCCH #2 respectively. It should be appreciated that although the quality report is ΔCQI in the example in FIG. 6, this is just an example and that the UE can also report ΔMCS. Another example is shown in FIG. 7, where the quality report is ΔMCS. Here the HARQ-ACK for PDSCH #1, PDSCH #2 and PDSCH #3 are multiplexed into PUCCH #1 in the form of a HARQ-ACK Codebook. In these arrangements, the ΔMCS for PDSCH #1, PDSCH #2 and PDSCH #3 are multiplexed also in PUCCH #1 as ΔMCS1, ΔMCS2 and ΔMCS3 respectively. Again, it should be appreciated that although the quality report is ΔMCS in FIG. 7, this is just an example and the UE can also report ΔCQI.

Figure 8:
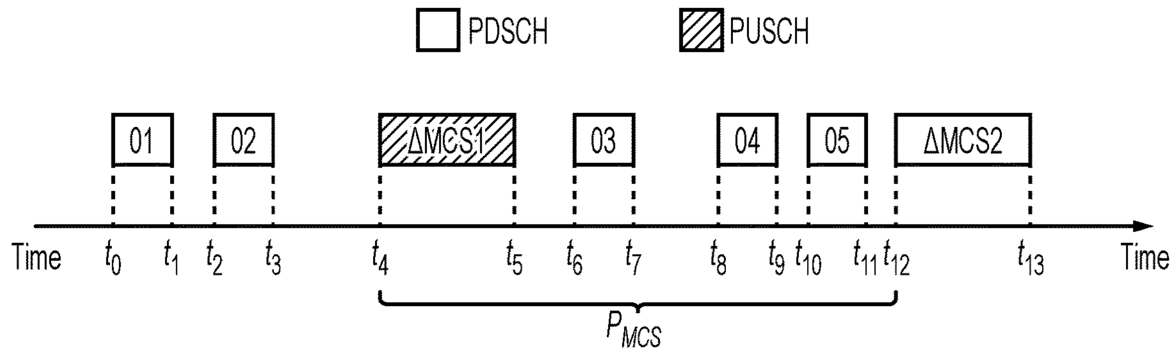
FIG. 8 shows an example of providing a quality report per group of PDSCHs in accordance with embodiments of the present technique.

In other arrangements of embodiments of the present technique, the quality report is determined based on multiple PDSCHs. In other words, at least one of the quality report types may be associated with a plurality of the PDSCHs. This quality report can be transmitted periodically, semi-persistently or aperiodically, i.e. similarly to how CSI reports are transmitted. That is, each quality report is determined based on the decoding of multiple PDSCHs. An example is shown in FIG. 8, where a quality report containing a value of ΔMCS is configured to be reported with a periodicity of $P_{MCS}$. Here the UE determines ΔMCS based on PDSCHs that fall within $P_{MCS}$. For example, ΔMCS2 is determined based on PDSCH 03, 04 and 05, which are transmitted between time $t_6$ and $t_{11}$. In other words, the plurality of PDSCHs associated with the at least one of the quality report types may be those of the PDSCHs to be received by the communications device from the wireless communications network that are scheduled to be received by the communications device within a particular time period, wherein the particular time period is associated with the at least one of the quality report types. It should be appreciated that not all PDSCHs within the periodicity, e.g. $P_{MCS}$, are associated with the same target BLER. There may be scenarios where a PDSCH with the target BLER is not scheduled or is missed by the UE within the periodicity. In such a case, the UE would report that "No PDSCH with the specified target BLER" is detected, and this can be represented by one of the states in the field indicating the quality report. This is beneficial to the gNB, especially if the UE has missed a PDSCH.

In other arrangements of embodiments of the present technique, the quality report is determined based on multiple PDSCHs, where one or more of the PDSCHs may be associated with a different target BLER to one or more other PDSCHs within a set of identified PDSCHs. This quality report can be transmitted periodically, semi-persistently or aperiodically, i.e. similarly to how CSI reports are transmitted. The UE determines the difference between the scheduled MCS for each PDSCH and the MCS that the UE considers would be required to meet the target BLER for that PDSCH. For example, the UE can be scheduled a first PDSCH with MCS11 and a target BLER of $10^{-1}$. The UE is then scheduled with a second PDSCH with MCS4 with a target BLER of $10^{-5}$. The UE determines that MCS9 would be preferred to achieve a target BLER of $10^{-1}$ for the first PDSCH and hence that ΔMCS=2 for the first PDSCH. The UE determines that MCS2 would be preferred to achieve a target BLER of $10^{-5}$ for the second PDSCH and hence that ΔMCS=2 for the second PDSCH. The UE hence determines that the quality report for the multiple PDSCHs is ΔMCS=2. While the ΔMCS has been derived based on PDSCHs with different BLER targets, for both PDSCHs it is consistent that the UE reports that the gNB had been over-ambitious in its scheduling decisions by 2 units of MCS. This arrangement of embodiments allows the UE to signal a single ΔMCS value for a set of PDSCHs with different BLER targets. In other words, the communications device may be configured to determine transmission quality levels for two or more quality report types, and to transmit the indication of the determined transmission quality levels as a single difference value (i.e. between the each of the determined transmission quality level and a scheduled quality level of the associated PDSCHs) for all of the two or more quality report types. Here, the communications device may be configured to determine that the difference between the each of the determined transmission quality level and a scheduled quality level of the associated PDSCHs is the same for two or more of the quality report types, before transmitting the indication of the determined transmission quality levels as the single difference value for all of the two or more quality report types. Alternatively, the communications device may be configured to perform a function (for example, a filtering function, average function, maximum function, minimum function, or percentile rank function, which are all discussed in further detail below) on the transmission quality levels for the two or more of the quality report types, before transmitting the indication of the determined transmission quality levels as the single difference value (as the result of the function) for all of the two or more quality report types.

In an arrangement of embodiments of the present technique where the quality report is based on multiple PDSCHs, the quality report is determined by filtering the calculated quality of the identified PDSCHs. In other words, the transmission quality level indicated for the at least one of the quality report types may be the result of a filtering function performed on the determined transmission quality levels for each of the plurality of PDSCHs associated with the at least one of the quality report types. In the example in FIG. 8, the UE filters the ΔMCS values of the identified PDSCHs within $P_{MCS}$, here ΔMCS2 is the filtered ΔMCS from PDSCH 03, 04 and 05.

In such an arrangement the filtering of the quality may be determined by performing a long term filtering of the instantaneous values of the quality unit. For example, if the quality is ΔMCS, then the long term filter quality report L at time t is, $L(t)=A\times L(t-1)+B\times \Delta MCS(t)$, where ΔMCS(t) is the ΔMCS determined for time t. The values of A and B are configurable or fixed in the specifications.

In another arrangement of embodiments of the present technique where the quality report is based on multiple PDSCHs, the quality report is determined by taking an average quality report of the identified PDSCHs. In other words, the transmission quality level indicated for the at least one of the quality report types may be an average of the determined transmission quality levels for each of the plurality of PDSCHs associated with the at least one of the quality report types.

In another arrangement of embodiments of the present technique where the quality report is based on multiple PDSCHs, the quality report is determined by taking the minimum value among the identified PDSCHs. For example, if the quality report is ΔMCS, it will report the smallest difference between the MCS of the scheduled PDSCH and the MCS required for a targeted BLER. In other words, the transmission quality level indicated for the at least one of the quality report types may be a minimum from among the determined transmission quality levels for each of the plurality of PDSCHs associated with the at least one of the quality report types.

In another arrangement of embodiments of the present technique where the quality report is based on multiple PDSCHs, the quality report is determined by taking the maximum value among the identified PDSCHs. In other words, the transmission quality level indicated for the at least one of the quality report types may be a maximum from among the determined transmission quality levels for each of the plurality of PDSCHs associated with the at least one of the quality report types. For example, if the quality report is ΔCQI, it will report the largest difference between the MCS of the scheduled PDSCH and the MCS required for a targeted BLER. The UE can then convert the difference in MCS to a ΔCQI. Use of the maximum MCS difference or maximum ΔCQI, in the quality report will help the gNB to schedule as conservatively and reliably as possible (the gNB will schedule with lower MCS values if the UE sends quality reports based on maximum MCS difference).

In another arrangement of embodiments of the present technique where the quality report is based on multiple PDSCHs, the quality report is determined by taking the X-percentile of the identified PDSCHs, where the X-percentile can be, for example, dynamically indicated (e.g. via DCI), RRC configured or fixed in the specifications. In other words, the transmission quality level indicated for the at least one of the quality report types may be selected from among the determined transmission quality levels for each of the plurality of PDSCHs associated with the at least one of the quality report types on the basis of the selected transmission quality level being at a specified percentile rank from among the determined transmission quality levels. For example, if the quality report is ΔCQI and X=5%, the UE will report the $5^{th}$ percentile of the CQI difference between the scheduled PDSCH and the CQI required for a targeted BLER—i.e. 95% of the CQIs for the other PDSCHs are of a higher quality level than the reported CQI. As a second example, if the quality report is ΔMCS and X=90%, the UE will report the $90^{th}$ percentile MCS of the difference between the scheduled PDSCH and MCS CQI required for a targeted BLER—i.e. only 10% of the MCSs for the other PDSCHs are of a higher quality level than the reported MCS.

As mentioned above, in some arrangements of embodiments of the present disclosure, the UE can be configured with multiple quality reports. That is, the network may signal multiple target BLERs for multiple data types; e.g. one target BLER for eMBB and one target BLER for URLLC. In other words, the indication of the determined transmission quality levels may comprise the transmission of one or more indications which between them indicate a plurality of different determined transmission quality levels.

In some such arrangements of embodiments of the present technique, the gNB can configure different target BLERs for different quality reports. In other words, the received indication of the one or more quality report types may comprise an indication of a plurality of different target BLERs to be used by the communications device to determine the transmission quality levels, wherein each of the different target BLERs is associated with one of the different determined transmission quality levels. Here, each of the plurality of target BLERs may be associated with data of a different type. That is, when configuring a quality report for a UE, the gNB can also configure the target BLER which the UE will use as a reference in determining the value of the quality report. For example, as mentioned above, a UE may receive two different services where one may have a target BLER of $10^{-5}$ e.g. for URLLC and another a target of $10^{-1}$, e.g. for eMBB. The gNB may want quality reports for each service and therefore configures the UE to report two quality reports where one has a target BLER of $10^{-5}$ and another has a target BLER of $10^{-1}$. The UE may be configured to report different transmission quality levels for these two quality reports also. For example, the UE may be configured to report ΔCQI for a PDSCH or set of PDSCHs for a target BLER of $10^{-1}$ in accordance with a first quality report type, and also to report MCS (directly, not as a delta value) or a target BLER of $10^{-5}$ in accordance with a first quality report type. Those skilled in the art would appreciate that this is simply an example, and that any combination of two or more quality reports may be configured.

In some such arrangements of embodiments of the present technique, in the case that a quality report is determined using multiple identified PDSCHs, the gNB can configure different functions in determining the quality quantity for different quality reports. In other words, the plurality of different determined transmission quality levels may be associated with a different plurality of the PDSCHs, wherein each of the plurality of determined transmission quality levels is determined using a different function (e.g. a filtering function, average function, maximum function, minimum function, or percentile rank function) from the others of the plurality of determined transmission quality levels. For example, the gNB can configure two quality reports where one uses an average function on a set of identified PDSCHs and another quality report uses a minimum function on another set of identified PDSCHs.

When configured with multiple quality reports, the UE can be configured to either (1) send the multiple quality reports in a single message (e.g. in a single PUCCH or single PUSCH) or (2) send each of the multiple quality reports in a different message (e.g. in different PUCCHs and/or different PUSCHs). In other words, each of the different determined transmission quality levels are indicated individually in different messages or, alternatively, each of the different determined transmission quality levels are indicated together in the same message. In another alternative method, groups of the different determined transmission quality levels may be indicated in different messages (e.g. if there are four determined transmission quality levels, these may be indicated in two different messages.

Thus, those skilled in the art will appreciate that four broad implementations exist on a high level, and these will be referred to as defined below throughout the below-described arrangements of embodiments of the present disclosure:

- First implementation: a UE (e.g. communications device 51) is configured with a single quality report (e.g. target BLER) on a per-PDSCH basis;
- Second implementation: a UE (e.g. communications device 51) is configured with a single quality report (e.g. target BLER) associated with a set of multiple PDSCHs;
- Third implementation: a UE (e.g. communications device 51) is configured with a plurality of quality reports (e.g. multiple target BLERs) on a per-PDSCH basis; and Fourth implementation: a UE (e.g. communications device 51) is configured with a plurality of quality reports (e.g. multiple target BLERs) associated with a set of multiple PDSCHs.

In some arrangements of embodiments of the present disclosure, the identified PDSCH or set of identified PDSCHs that is used for determination of the quality report is dynamically indicated by the gNB. In other words, the UE (e.g. communications device 51) may be configured to determine the association between at least one of the PDSCHs and one of the quality report types based on a dynamic indication received from the wireless communications network. Here, the indicator can be carried in the DL Grant or in the SPS activation DCI. That is, in other words, the dynamic indication may be comprised within downlink control information, DCI, received from the wireless communications network, where the DCI is a downlink grant indicating a set of downlink radio resources of the wireless radio interface within which the at least one of the PDSCHs is to be received by the communications device or, alternatively, where the DCI is an activation DCI indicating that a semi-persistent scheduling, SPS, resource instance within which downlink signals may be received by the communications device is activated, the activation DCI therefore indicating that the SPS resource instance is to be used by the communications device for receiving the at least one of the PDSCHs.

In some arrangements of embodiments of the present technique, the dynamic indicator is the RNTI of the DCI. As mentioned above, the DCI can be the DL Grant scheduling the PDSCH or the activation DCI for the SPS. That is, in other words, the dynamic indication is an identifier of the DCI.

Figure 9:
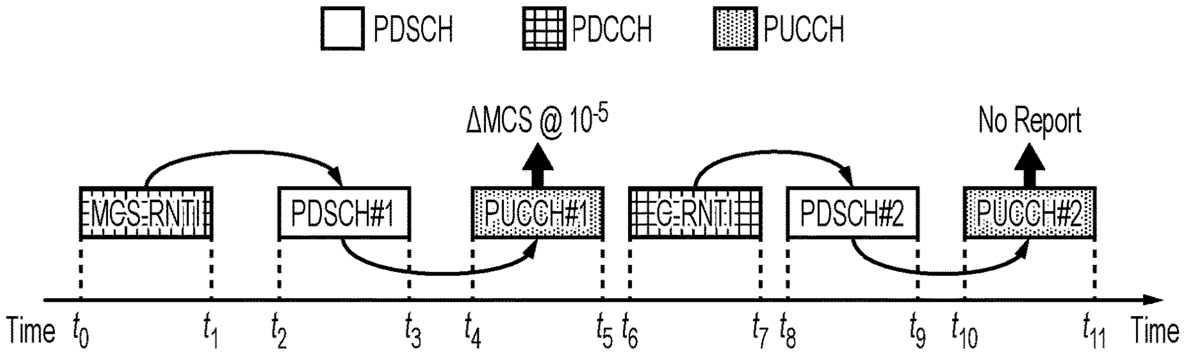
FIG. 9 illustrates an example of how a Radio Network Temporary Identifier (RNTI) may be used to indicate whether or not a User Equipment (UE) needs to provide a quality report in accordance with embodiments of the present technique.

Here, in the first implementation, the RNTI can be used in an arrangement of embodiments of the present disclosure to indicate whether the UE needs to transmit a quality report or not. Here, for example, the RNTI can be the MCS-RNTI. The MCS-RNTI is used for DL Grant where the scheduled MCS index in the DCI refers to a high reliability (or low spectral efficiency) MCS table. The high reliability MCS table is typically used for a PDSCH carrying URLLC traffic and hence the MCS-RNTI can be used to implicitly indicate that the UE is to transmit a quality report such as ΔCQI or ΔMCS. An example is shown in FIG. 9, where MCS-RNTI indicates whether the UE needs to provide a quality report or not. Here PDSCH #1 is scheduled using a DL Grant with CRC masked with MCS-RNTI and so the UE transmits a ΔMCS quality report to the gNB using the corresponding PUCCH #1. PDSCH #2 is scheduled using a DL Grant with the CRC masked with C-RNTI and so the UE does not need to provide any reports to the gNB in PUCCH #2 (where PUCCH #2 can therefore contain only the HARQ-ACK).

Figure 10:
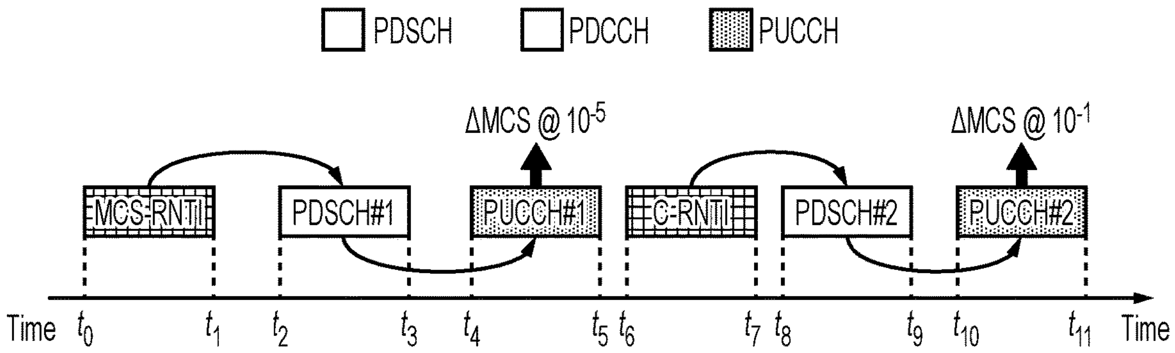
FIG. 10 illustrates an example of how an RNTI may be used to indicate a target Block Error Rate (BLER) in accordance with embodiments of the present technique.

In the second implementation, the RNTI can be used in an arrangement of embodiments of the present disclosure to indicate the different configured quality reports that can have different BLER targets. An example is shown in FIG. 10, where MCS-RNTI indicates that the ΔMCS report references a target BLER of $10^{-5}$ whilst a C-RNTI indicates that the ΔMCS report references a target BLER of $10^{-1}$. The PUCCHs in FIG. 10 can also carry the HARQ-ACK feedback of the corresponding PDSCHs in addition to the ΔMCS report.

Figure 11:
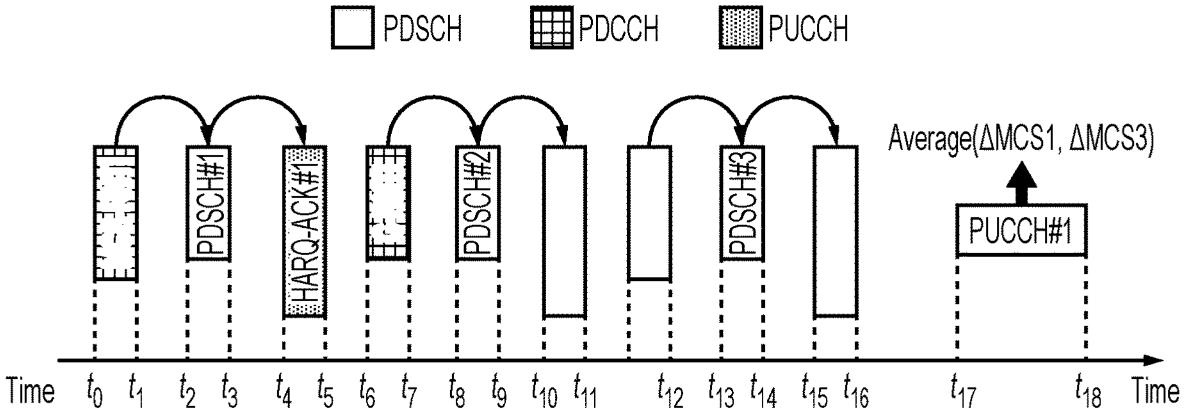
FIG. 11 illustrates an example of how an RNTI may be used to indicate which PDSCH(s) are to be used by the UE to calculate a quality report in accordance with embodiments of the present technique.

In the third implementation, the RNTI can be used in an arrangement of embodiments of the present disclosure to indicate whether the scheduled PDSCH or activated SPS is included in the determination of the quality report. Here, like for the first implementation as described above, the RNTI can be the MCS-RNTI or CS-RNTI. An example is shown in FIG. 11, where a PUCCH is used to carry a periodic quality report. It will be appreciated by those skilled in the art that a PUSCH can also be used to carry the quality report and, as such arrangements of embodiments of the present technique are not limited to PUCCH. The quality report feeds back an average ΔMCS of the set of identified PDSCH, where, as per this arrangement, the set of identified PDSCHs are indicated using MCS-RNTI. In this example, PDSCH #1 and PDSCH #3 are scheduled using DL Grant with CRC masked with MCS-RNTI whilst PDSCH #2 is scheduled with DL Grant with CRC masked with C-RNTI. Hence the quality report takes the average of ΔMCS1 and ΔMCS3 corresponding to PDSCH #1 and PDSCH #3 respectively.

Figure 12:
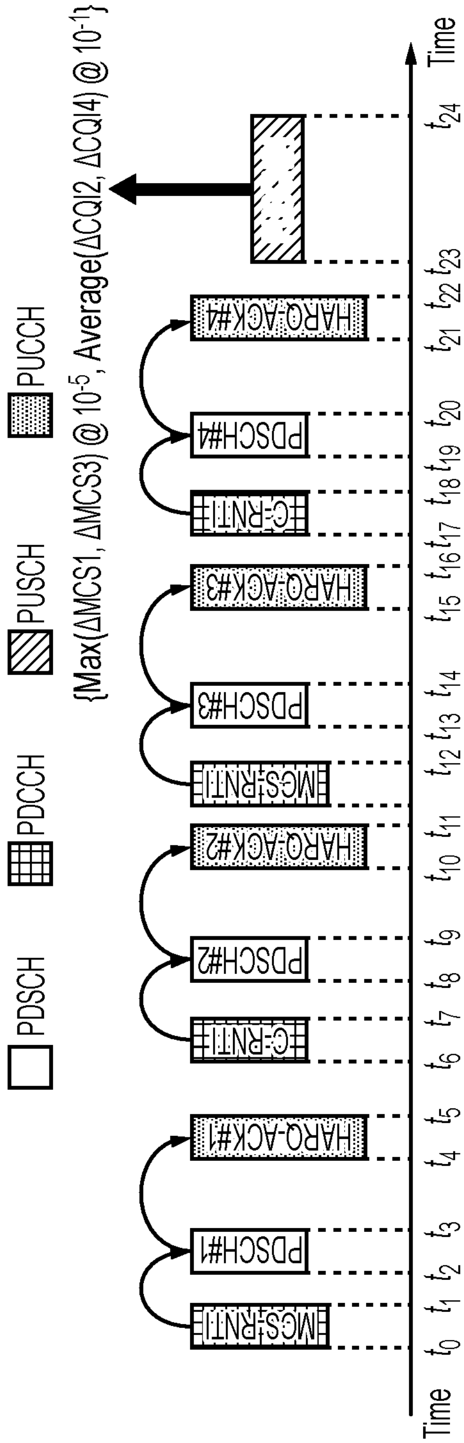
FIG. 12 illustrates an example of how an RNTI may be used to indicate that a UE should transmit different quality reports in accordance with embodiments of the present technique.

In the fourth implementation, the RNTI can be used in an arrangement of embodiments of the present disclosure to indicate scheduled PDSCHs or activated SPS that belong to different configured quality reports with different BLER targets or functions. An example is shown in FIG. 12, where PDSCH #1 and PDSCH #3 are scheduled with DL Grant using MCS-RNTI indicating they are used in determining a quality report with a target BLER of $10^{-5}$ whist PDSCH #2 and PDSCH #4 are scheduled with DL Grant using C-RNTI indicating they are used in determining a quality report with a target BLER of $10^{-1}$. Here the first quality report with $10^{-5}$ BLER target uses a maximum function of the ΔMCS on the indicated PDSCHs and the second quality report with $10^{-1}$ BLER target uses an average function of the ΔCQI of the indicated PDSCHs. This example is to show that different quality reports can have different functions and different reported parameters, though in other examples the functions and parameters used may be the same. These two quality reports are transmitted using PUSCH #1.

In another arrangement of embodiments of the present disclosure, the said dynamic indicator is a new DCI field. In other words, the dynamic indication is indicated by a new field of the DCI, comprising one or more bits, which is specific to the purpose of providing the dynamic indication.

Here, in the first implementation, the new field can be used in an arrangement of embodiments of the present disclosure to indicate whether a scheduled PDSCH or activated SPS requires a quality report. This can be a one-bit indicator. In an example, the gNB can indicate that those PDSCHs that are associated with URLLC require quality reports and those PDSCHs that are associated with eMBB do not require quality reports.

In the second implementation, the new field can be used in an arrangement of embodiments of the present disclosure to indicate which target BLER a scheduled PDSCH or activated SPS should use in determining and reporting the associated quality report. This can be an indexed indicator where each index points to different configured quality reports with different BLER targets.

In the third implementation, the new field can be used in an arrangement of embodiments of the present disclosure to indicate which scheduled PDSCHs or activated SPS are used in determining the value in a quality report. This can be a one-bit indicator, which indicates whether a scheduled PDSCH is included or excluded from the quality report calculation.

In the fourth implementation, the new field can be used in an arrangement of embodiments of the present disclosure to indicate which scheduled PDSCHs or activated SPSs belong to the configured quality report and the BLER targets or functions associated with the PDSCHs in the quality report. This can be an indexed indicator where each index points to a different configured quality report. For example, if there are four quality reports, then for each PDSCH, the gNB indicates which of these quality reports this PDSCH belongs to, hence two bits are needed for the indicator signaling.

In another arrangement of embodiments of the present technique, the said dynamic indicator is the L1 priority of the associated PUCCH carrying the HARQ-ACK feedback for the PSDCH. In other words, the dynamic indication may be comprised within a physical layer priority indicator of a physical uplink control channel, PUCCH, wherein PUCCH is associated with the at least one of the PDSCHs and scheduled for the communications device to transmit feedback for data received via the at least one of the PDSCHs.

Here, in the first implementation, the L1 priority indicator can be used in an arrangement of embodiments of the present disclosure to indicate whether the UE should provide a quality report for a scheduled PDSCH or activated SPS. For example, if the L1 indicator=High Priority, the UE provides a quality report but otherwise, if L1 indicator=Low Priority, the UE does not provide a quality report.

In the second implementation, the L1 priority indicator can be used in an arrangement of embodiments of the present disclosure to indicate which configured quality report (where the configured quality reports can have different BLER targets), the UE should report. For example, if L1 indicator=High Priority, the UE sends a quality report using a BLER target of $10^5$ and if the L1 indicator=Low Priority, the UE sends a quality report using BLER target of $10^{-1}$.

In the third implementation, the L1 priority indicator can be used in an arrangement of embodiments of the present disclosure to indicate which scheduled PDSCH or activated SPS are used to determine the quality report. For example, PDSCH scheduled with a PUCCH L1 priority=High Priority are used in calculating the quality report whereas those with L1 priority=Low Priority are not used in calculating the quality report.

In the fourth implementation, the L1 priority indicator can be used in an arrangement of embodiments of the present disclosure to indicate which scheduled PDSCH or activated SPS belong to which configured quality reports that can have different BLER targets or functions. For example, PDSCHs scheduled with a PUCCH L1 priority=High Priority are used in calculating a quality report with BLER target=$10^{-5}$ and those with PUCCH L1 priority=Low Priority are used in calculating another quality report with BLER target=$10^{-1}$.

In another arrangement of embodiments of the present technique, the said dynamic indicator is the "PDSCH Group Index" of the PDSCH. The PDSCH Group Index is an existing field in the DL Grant used for enhanced Type 2 HARQ-ACK Codebook, where a PDSCH can be identified as belonging to Group 1 or Group 2, and the PUCCH of the enhanced Type 2 HARQ-ACK Codebook would be further indicated using the "Number of requested PDSCH group" field to feedback HARQ-ACKs for Group 1 PDSCHs, Group 2 PDSCHs or both Group 1 & Group 2 PDSCHs. In other words, the dynamic indication may be comprised within a PDSCH group index, wherein the PDSCH group index indicates which of a plurality of groups the at least one of the PDSCHs belongs to. Enhanced Type 2 HARQ-ACK Codebook was introduced in Rel-16 for NR-U. Further description of Enhanced Type 2 HARQ-ACK Codebook may be found in co-pending European patent with application number EP20187799.0 [5], the contents of which are hereby incorporated by reference.

Here, in the first implementation, the PDSCH Group Index can be used in an arrangement of embodiments of the present disclosure to indicate whether a UE needs to feedback a quality report for the scheduled PDSCH. For example, the gNB can configure such that PDSCHs with indicated PDSCH Group Index=1 would require a quality report feedback and those with PDSCH Group Index=0 or without a configured PDSCH Group Index do not need to feedback a quality report. The gNB can configure the interpretation of the PDSCH Group Index, e.g. such that value 1="report" and value 0="not report" or vice versa, or this group index value and its interpretation can be fixed in the specifications.

In the second implementation, the PDSCH Group Index can be used in an arrangement of embodiments of the present disclosure to indicate which configured quality report (that can have different BLER targets or functions) the UE should report for the scheduled PDSCH. For example, a PDSCH with PDSCH Group Index=1 requires a quality report with BLER target=$10^{-5}$ whilst a PDSCH with PDSCH Group Index=0 requires a quality report with BLER target=$10^{-1}$.

In the third implementation, the PDSCH Group Index can be used in an arrangement of embodiments of the present disclosure to indicate whether a scheduled PDSCH is used in the determination of the quality report. For example, PDSCHs with PDSCH Group Index=0 are included in calculating the quality report in the next feedback instance whilst PDSCHs with PDSCH Group Index=1 are excluded in calculating the quality report in the next feedback instance. It should be appreciated by those skilled in the art that the PDSCH Group Index value interpretation can be configured by the gNB or fixed in the specifications, e.g. value "0" can be configured to indicate EXCLUDE instead of INCLUDE or vice-versa.

In the fourth implementation, the PDSCH Group Index can be used in an arrangement of embodiments of the present disclosure to indicate which of the configured quality reports that can have different BLER targets or functions, that the scheduled PDSCH belongs to for determining the value of that quality report.

For example, PDSCHs with PDSCH Group Index=0 are used in calculating for a quality report with target BLER=$10^{-5}$ whilst PDSCHs with PDSCH Group Index=1 are used in calculating for another quality report with target BLER=$10^{-1}$.

In another arrangement of embodiments of the present technique, the dynamic indicator is the "PDSCH-to-HARQ_feedback timing indicator". The "PDSCH-to-HARQ_feedback timing indicator" is carried in the DL Grant and is used to indicate the $K_1$ value which is the slot or sub-slot offset where the PUCCH carrying HARQ-ACK for the PDSCH is to be transmitted. In other words, the dynamic indication may be comprised within a feedback timing indicator, wherein the feedback timing indicator indicates uplink radio resources of the wireless radio interface, in which the communications device is to transmit feedback for data received via the at least one of the PDSCHs, with respect to downlink radio resources of the wireless radio interface in which the at least one of the PDSCHs is received. For cases where the quality report is associated with multiple PDSCHs (e.g. in the second and fourth implementations), the PDSCHs whose $K_1$ values point to the same slot or sub-slot are used to calculate using a function for the quality report.

Figure 13:
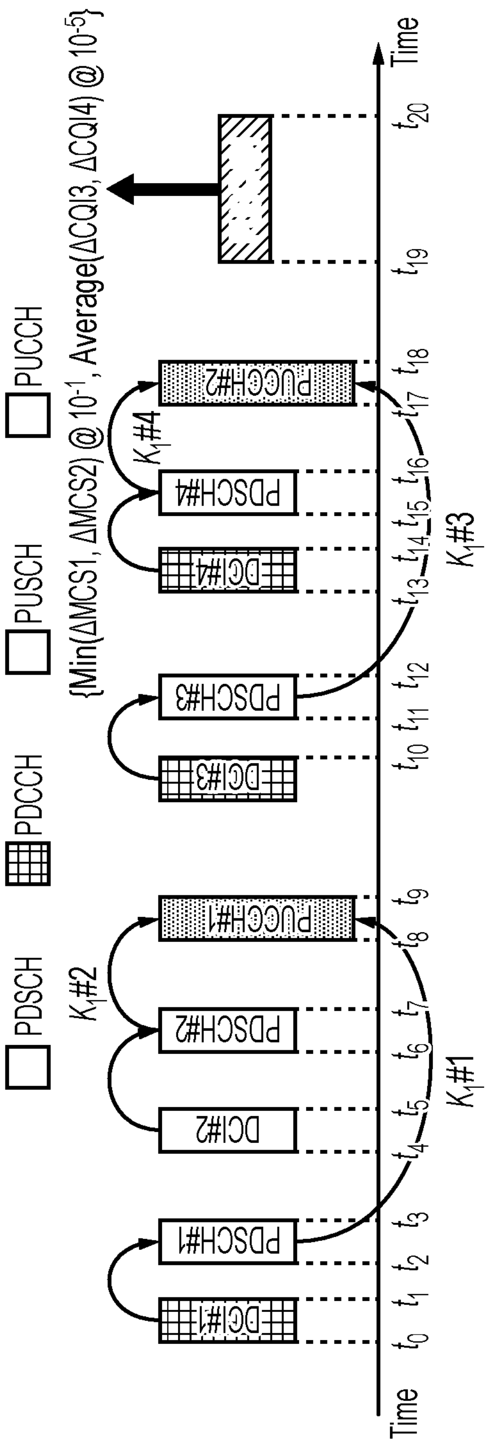
FIG. 13 shows an example of how a plurality of PDSCHs for which feedback is to be transmitted in the same PUCCH may be associated with a single quality report in accordance with embodiments of the present technique.

An example is shown in FIG. 13, where DCI #1, DCI #2, DCI #3 and DCI #4 schedule PDSCH #1, PDSCH #2, PDSCH #3 and PDSCH #4 respectively. The $K_1$ values for PDSCH #1 and PDSCH #2 are $K_1$#1 and $K_1$#2 respectively which point to the same slot thereby their HARQ-ACKs are multiplexed into PUCCH #1. The $K_1$ values for PDSCH #3 and PDSCH #4 are $K_1$#3 and $K_1$#4 respectively which point to the same slot, and thereby their HARQ-ACKs are multiplexed into PUCCH #2. As per this arrangement, since PDSCH #1 and PDSCH #2 share the same PUCCH, they are used to calculate a quality report, which uses a minimum function of their ΔMCS with a target BLER of $10^{-1}$, i.e. Min(ΔMCS1, ΔMCS2). Similarly, PDSCH #3 and PDSCH #4 are used to calculate another quality report, which uses an average function of their ΔCQI with a target BLER of $10^{-5}$, i.e. Average(ΔCQI3, ΔCQI4). The different quality reports (different BLER and/or functions) for the PDSCHs sharing the same PUCCH can be indicated using one of the embodiments in this invention (including semi-static indications). In this example, the quality reports are transmitted using PUSCH #1. It should be appreciated that the PUCCHs carrying the HARQ-ACK feedbacks can also carry the quality report. For example, PUCCH #1 can carry the quality report with value Min(ΔMCS1, ΔMCS2) and PUCCH #2 can carry the quality report with Average (ΔCQI3, ΔCQI4).

In some arrangements of embodiments of the present disclosure, the identified PDSCH or set of PDSCHs that is used for determination of the quality report is semi-statically configured. In other words, the communications device may be configured to determine the association between each of the PDSCHs and one of the quality report types based on a semi-static indication received from the wireless communications network. In some such arrangements, the semi-static indication may be RRC signalling by the gNB (i.e. a radio resource control, RRC, indication received from the wireless communications network).

In some such arrangements, the said semi-static configuration is the SPS configuration (which may be indicated from among a plurality of SPS configurations).

Here, in the first implementation, in an arrangement of embodiments of the present disclosure, for each SPS Configuration the gNB can configure whether a quality report is required or not for the PDSCH of the SPS configuration.

In the second implementation, in an arrangement of embodiments of the present disclosure, for each SPS Configuration the gNB can configure a quality report where different SPS Configuration Index values can have a different quality report with different BLER targets. It would be appreciated by those skilled in the art that in Rel-16, the UE can be configured with up to eight SPS and so potentially there can be up to eight different quality reports (i.e. eight different BLER targets). It should be appreciated that there can be two or more SPS associated with the same quality report in any suitable format; e.g. four SPS may be associated with a first BLER target and four SPS may be associated with a second BLER target, or alternatively four SPS may be associated with a first BLER target, two SPS may be associated with a second BLER target, and the final two SPS may be associated with a third BLER target.

In the third implementation, in an arrangement of embodiments of the present disclosure, the gNB can configure which SPS PDSCHs are used in determining a quality report.

In the fourth implementation, in an arrangement of embodiments of the present disclosure, the gNB can configure one or more SPS configurations to be associated with a quality report and different SPS configuration(s) are associated with different quality reports which can have different BLER targets or functions. For example the gNB can configure three SPS configurations, SPS #1, SPS #2 and SPS #3 such that the PDSCHs in SPS #1 and SPS #2 are used in calculating the average ΔMCS with target BLER of $10^{-1}$ at a periodic reporting instance and the PDSCHs of SPS #3 are used in calculating the maximum ΔCQI with target BLER of $10^{-5}$ at another periodic reporting instance.

In other such arrangements, the said semi-static configuration is the HARQ Process ID (i.e. an identifier of a hybrid automatic repeat request, HARQ, process from among a plurality of HARQ processes).

Here, in the first implementation, in an arrangement of embodiments of the present disclosure, the gNB can configure which HARQ Process ID requires a quality report.

In the second implementation, in an arrangement of embodiments of the present disclosure, the gNB can configure one or more HARQ Process IDs to a quality report. Multiple quality reports with different BLER targets or functions can be configured, where each quality report can be associated with different HARQ Process IDs.

In the third implementation, in an arrangement of embodiments of the present disclosure, the gNB can configure the HARQ Process IDs associated with the PDSCH that are used for determining a quality report.

In the fourth implementation, in an arrangement of embodiments of the present disclosure, the gNB can configure a set of HARQ Process IDs associated with a quality report with a BLER target or function and another set of HARQ Process IDs associated with another quality report with another BLER target or function.

Figure 14:
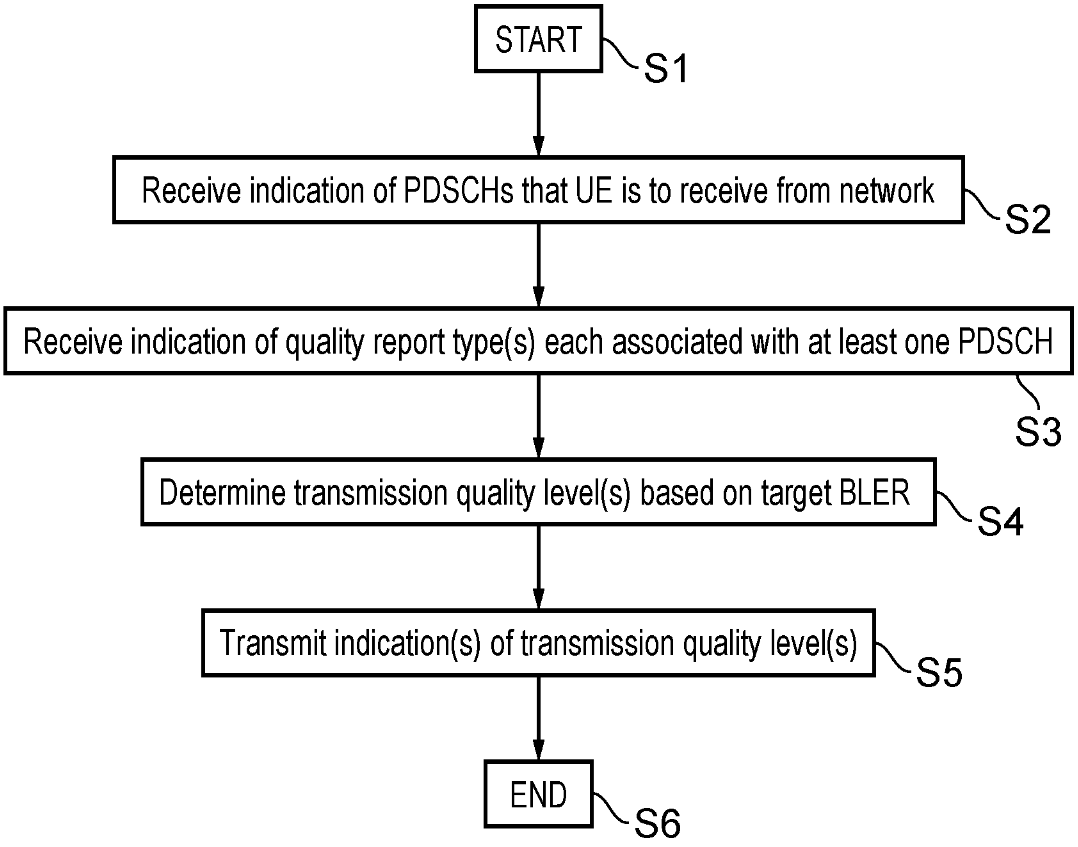
FIG. 14 shows a flow diagram illustrating a process of communications in a communications system in accordance with embodiments of the present technique.

FIG. 14 shows a flow diagram illustrating an example process of communications in a communications system in accordance with embodiments of the present technique. The process shown by FIG. 14 is a method of operating a communications device configured to transmit signals to and/or to receive signals from a wireless communications network (e.g. to or from an infrastructure equipment of the wireless communications network).

The method begins in step S1. The method comprises, in step S2, receiving, from the wireless communications network, an indication of one or more physical downlink shared channel, PDSCHs, to be received by the communications device from the wireless communications network via the radio access interface. In step S3, the process comprises receiving, from the wireless communications network, an indication of whether to report one or more quality report types, wherein each of the quality report types is associated with at least one of the PDSCHs. In step S4, the method comprises determining, for at least one of the quality report types, a transmission quality level with which the wireless communications network would need to transmit the associated PDSCHs such that the communications device would receive the associated PDSCHs at a target block error rate, BLER. Then, in step S5, the process comprises transmitting to the wireless communications network, for the at least one quality report type, an indication of the determined transmission quality levels. The process ends in step S6.

Those skilled in the art would appreciate that the method shown by FIG. 14 may be adapted in accordance with embodiments of the present technique. For example, other intermediate steps may be included in this method, or the steps may be performed in any logical order. Though embodiments of the present technique have been described largely by way of the example communications system shown in FIG. 5, and described by way of the arrangements shown by FIGS. 6 to 13, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may, without departing from the scope of the claims, form part of communications systems other than those defined by the present disclosure.

The following numbered paragraphs provide further example aspects and features of the present technique:

Paragraph 1. A method of operating a communications device configured to transmit signals to and/or to receive signals from a wireless communications network via a wireless radio interface provided by the wireless communications network, the method comprising receiving, from the wireless communications network, an indication of one or more physical downlink shared channel, PDSCHs, to be received by the communications device from the wireless communications network via the radio access interface, receiving, from the wireless communications network, an indication of whether to report one or more quality report types, wherein each of the quality report types is associated with at least one of the PDSCHs, determining, for at least one of the quality report types, a transmission quality level with which the wireless communications network would need to transmit the associated PDSCHs such that the communications device would receive the associated PDSCHs at a target block error rate, BLER, and transmitting to the wireless communications network, for the at least one quality report type, an indication of the determined transmission quality levels.

Paragraph 2. A method according to Paragraph 1, wherein the associated PDSCHs are to carry data of a type associated with the target BLER used by the communications device to determine the transmission quality level for the at least one quality report type.

Paragraph 3. A method according to Paragraph 1 or Paragraph 2, wherein the associated PDSCHs are to carry data of a type associated with a different target BLER to the target BLER used by the communications device to determine the transmission quality level for the at least one quality report type.

Paragraph 4. A method according to any of Paragraphs 1 to 3, wherein the indication of the determined transmission quality levels directly indicates the values of the determined transmission quality levels.

Paragraph 5. A method according to any of Paragraphs 1 to 4, wherein the indication of the determined transmission quality levels indicates each of the determined transmission quality level as a difference value indicating a difference between the each of the determined transmission quality level and a scheduled quality level of the associated PDSCHs.

Paragraph 6. A method according to Paragraph 5, comprising determining transmission quality levels for two or more quality report types, and transmitting the indication of the determined transmission quality levels as a single difference value for all of the two or more quality report types.

Paragraph 7. A method according to any of Paragraphs 1 to 6, wherein the transmission quality level is a channel quality indicator, CQI.

Paragraph 8. A method according to any of Paragraphs 1 to 7, wherein the transmission quality level is a modulation and coding scheme, MCS.

Paragraph 9. A method according to any of Paragraphs 1 to 8, wherein at least one of the quality report types is associated with a plurality of the PDSCHs.

Paragraph 10. A method according to Paragraph 9, wherein the plurality of PDSCHs associated with the at least one of the quality report types are those of the PDSCHs to be received by the communications device from the wireless communications network that are scheduled to be received by the communications device within a particular time period, wherein the particular time period is associated with the at least one of the quality report types.

Paragraph 11. A method according to Paragraph 9 or Paragraph 10, wherein the transmission quality level indicated for the at least one of the quality report types is the result of a filtering function performed on the determined transmission quality levels for each of the plurality of PDSCHs associated with the at least one of the quality report types.

Paragraph 12. A method according to any of Paragraphs 9 to 11, wherein the transmission quality level indicated for the at least one of the quality report types is an average of the determined transmission quality levels for each of the plurality of PDSCHs associated with the at least one of the quality report types.

Paragraph 13. A method according to any of Paragraphs 9 to 12, wherein the transmission quality level indicated for the at least one of the quality report types is a minimum from among the determined transmission quality levels for each of the plurality of PDSCHs associated with the at least one of the quality report types.

Paragraph 14. A method according to any of Paragraphs 9 to 13, wherein the transmission quality level indicated for the at least one of the quality report types is a maximum from among the determined transmission quality levels for each of the plurality of PDSCHs associated with the at least one of the quality report types.

Paragraph 15. A method according to any of Paragraphs 9 to 14, wherein the transmission quality level indicated for the at least one of the quality report types is selected from among the determined transmission quality levels for each of the plurality of PDSCHs associated with the at least one of the quality report types on the basis of the selected transmission quality level being at a specified percentile rank from among the determined transmission quality levels.

Paragraph 16. A method according to any of Paragraphs 1 to 15, wherein the indication of the determined transmission quality levels comprises the transmission of one or more indications which between them indicate a plurality of different determined transmission quality levels.

Paragraph 17. A method according to Paragraph 16, wherein the received indication of the one or more quality report types comprises an indication of a plurality of different target BLERs to be used by the communications device to determine the transmission quality levels, wherein each of the different target BLERs is associated with one of the different determined transmission quality levels.

Paragraph 18. A method according to Paragraph 17, wherein each of the plurality of target BLERs is associated with data of a different type.

Paragraph 19. A method according to any of Paragraphs 16 to 18, wherein the plurality of different determined transmission quality levels are associated with a different plurality of the PDSCHs, and wherein each of the plurality of determined transmission quality levels is determined using a different function from the others of the plurality of determined transmission quality levels.

Paragraph 20. A method according to any of Paragraphs 16 to 19, wherein each of the different determined transmission quality levels are indicated individually in different messages.

Paragraph 21. A method according to any of Paragraphs 16 to 20, wherein each of the different determined transmission quality levels are indicated together in the same message.

Paragraph 22. A method according to any of Paragraphs 1 to 21, comprising determining the association between at least one of the PDSCHs and one of the quality report types based on a dynamic indication received from the wireless communications network.

Paragraph 23. A method according to Paragraph 22, wherein the dynamic indication is comprised within downlink control information, DCI, received from the wireless communications network.

Paragraph 24. A method according to Paragraph 23, wherein the DCI is a downlink grant indicating a set of downlink radio resources of the wireless radio interface within which the at least one of the PDSCHs is to be received by the communications device.

Paragraph 25. A method according to Paragraph 23 or Paragraph 24, wherein the DCI is an activation DCI indicating that a semi-persistent scheduling, SPS, resource instance within which downlink signals may be received by the communications device is activated, the activation DCI therefore indicating that the SPS resource instance is to be used by the communications device for receiving the at least one of the PDSCHs.

Paragraph 26. A method according to any of Paragraphs 23 to 25, wherein the dynamic indication is an identifier of the DCI.

Paragraph 27. A method according to any of Paragraphs 23 to 26, wherein the dynamic indication is indicated by a new field of the DCI, comprising one or more bits, which is specific to the purpose of providing the dynamic indication.

Paragraph 28. A method according to any of Paragraphs 22 to 27, wherein the dynamic indication is comprised within a physical layer priority indicator of a physical uplink control channel, PUCCH, wherein PUCCH is associated with the at least one of the PDSCHs and scheduled for the communications device to transmit feedback for data received via the at least one of the PDSCHs.

Paragraph 29. A method according to any of Paragraphs 22 to 28, wherein the dynamic indication is comprised within a PDSCH group index, wherein the PDSCH group index indicates which of a plurality of groups the at least one of the PDSCHs belongs to.

Paragraph 30. A method according to any of Paragraph 22 to 29, wherein the dynamic indication is comprised within a feedback timing indicator, wherein the feedback timing indicator indicates uplink radio resources of the wireless radio interface, in which the communications device is to transmit feedback for data received via the at least one of the PDSCHs, with respect to downlink radio resources of the wireless radio interface in which the at least one of the PDSCHs is received.

Paragraph 31. A method according to any of Paragraphs 1 to 30, comprising determining the association between each of the PDSCHs and one of the quality report types based on a semi-static indication received from the wireless communications network.

Paragraph 32. A method according to Paragraph 31, wherein the semi-static indication is a radio resource control, RRC, indication received from the wireless communications network.

Paragraph 33. A method according to Paragraph 31 or Paragraph 32, wherein the semi-static indication is a semi-persistent scheduling, SPS, configuration indicated from among a plurality of SPS configurations.

Paragraph 34. A method according to any of Paragraphs 31 to 33, wherein the semi-static indication is an identifier of a hybrid automatic repeat request, HARQ, process from among a plurality of HARQ processes.

Paragraph 35. A communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry to receive, from the wireless communications network, an indication of one or more physical downlink shared channel, PDSCHs, to be received by the communications device from the wireless communications network via the radio access interface, to receive, from the wireless communications network, an indication of whether to report one or more quality report types, wherein each of the quality report types is associated with at least one of the PDSCHs, to determine, for at least one of the quality report types, a transmission quality level with which the wireless communications network would need to transmit the associated PDSCHs such that the communications device would receive the associated PDSCHs at a target block error rate, BLER, and to transmit to the wireless communications network, for the at least one quality report type, an indication of the determined transmission quality levels.

Paragraph 36. Circuitry for a communications device configured to transmit signals to and/or to receive signals from a wireless communications network, the communications device comprising transceiver circuitry configured to transmit signals and receive signals via a wireless radio interface provided by the wireless communications network, and controller circuitry configured in combination with the transceiver circuitry to receive, from the wireless communications network, an indication of one or more physical downlink shared channel, PDSCHs, to be received by the communications device from the wireless communications network via the radio access interface, to receive, from the wireless communications network, an indication of whether to report one or more quality report types, wherein each of the quality report types is associated with at least one of the PDSCHs, to determine, for at least one of the quality report types, a transmission quality level with which the wireless communications network would need to transmit the associated PDSCHs such that the communications device would receive the associated PDSCHs at a target block error rate, BLER, and to transmit to the wireless communications network, for the at least one quality report type, an indication of the determined transmission quality levels.

Paragraph 37. A method of operating an infrastructure equipment forming part of a wireless communications network configured to transmit signals to and/or to receive signals from a communications device via a wireless radio interface provided by the infrastructure equipment, the method comprising transmitting, to the communications device, an indication of one or more physical downlink shared channel, PDSCHs, to be transmitted by the infrastructure equipment to the communications device via the radio access interface, transmitting, to the communications device, an indication of whether the communications device is to report one or more quality report types, wherein each of the quality report types is associated with at least one of the PDSCHs, and receiving from the communications device, for at least one of the quality report types, an indication of a transmission quality level with which the infrastructure equipment would need to transmit the associated PDSCHs such that the communications device would receive the associated PDSCHs at a target block error rate, BLER.

Paragraph 38. A method according to Paragraph 37, wherein the associated PDSCHs are to carry data of a type associated with the target BLER used by the communications device to determine the transmission quality level for the at least one quality report type.

Paragraph 39. A method according to Paragraph 37 or Paragraph 38, wherein the associated PDSCHs are to carry data of a type associated with a different target BLER to the target BLER used by the communications device to determine the transmission quality level for the at least one quality report type.

Paragraph 40. A method according to any of Paragraphs 37 to 39, wherein the indication of the transmission quality levels directly indicates the values of the transmission quality levels.

Paragraph 41. A method according to any of Paragraphs 37 to 40, wherein the indication of the transmission quality levels indicates each of the transmission quality level as a difference value indicating a difference between the each of the transmission quality level and a scheduled quality level of the associated PDSCHs.

Paragraph 42. A method according to Paragraph 41, comprising receiving an indication of the transmission quality levels as a single difference value for all of two or more quality report types.

Paragraph 43. A method according to any of Paragraphs 37 to 42, wherein the transmission quality level is a channel quality indicator, CQI.

Paragraph 44. A method according to any of Paragraphs 37 to 43, wherein the transmission quality level is a modulation and coding scheme, MCS.

Paragraph 45. A method according to any of Paragraphs 37 to 44, wherein at least one of the quality report types is associated with a plurality of the PDSCHs.

Paragraph 46. A method according to Paragraph 45, wherein the plurality of PDSCHs associated with the at least one of the quality report types are those of the PDSCHs to be received by the communications device from the infrastructure equipment that are scheduled to be received by the communications device within a particular time period, wherein the particular time period is associated with the at least one of the quality report types.

Paragraph 47. A method according to Paragraph 45 or Paragraph 46, wherein the transmission quality level indicated for the at least one of the quality report types is the result of a filtering function performed by the communications device on the transmission quality levels for each of the plurality of PDSCHs associated with the at least one of the quality report types.

Paragraph 48. A method according to any of Paragraphs 45 to 47, wherein the transmission quality level indicated for the at least one of the quality report types is an average of the transmission quality levels for each of the plurality of PDSCHs associated with the at least one of the quality report types.

Paragraph 49. A method according to any of Paragraphs 45 to 48, wherein the transmission quality level indicated for the at least one of the quality report types is a minimum from among the transmission quality levels for each of the plurality of PDSCHs associated with the at least one of the quality report types.

Paragraph 50. A method according to any of Paragraphs 45 to 49, wherein the transmission quality level indicated for the at least one of the quality report types is a maximum from among the transmission quality levels for each of the plurality of PDSCHs associated with the at least one of the quality report types.

Paragraph 51. A method according to any of Paragraphs 45 to 50, wherein the transmission quality level indicated for the at least one of the quality report types is selected from among the transmission quality levels for each of the plurality of PDSCHs associated with the at least one of the quality report types on the basis of the selected transmission quality level being at a specified percentile rank from among the transmission quality levels.

Paragraph 52. A method according to any of Paragraphs 37 to 51, wherein the indication of the transmission quality levels comprises the reception of one or more indications which between them indicate a plurality of different transmission quality levels.

Paragraph 53. A method according to Paragraph 52, wherein the received indication of the one or more quality report types comprises an indication of a plurality of different target BLERs to be used by the communications device to determine the transmission quality levels, wherein each of the different target BLERs is associated with one of the different transmission quality levels.

Paragraph 54. A method according to Paragraph 53, wherein each of the plurality of target BLERs is associated with data of a different type.

Paragraph 55. A method according to any of Paragraphs 52 to 54, wherein the plurality of different transmission quality levels are associated with a different plurality of the PDSCHs, and wherein each of the plurality of transmission quality levels is determined by the communications device using a different function from the others of the plurality of transmission quality levels.

Paragraph 56. A method according to any of Paragraphs 52 to 55, wherein each of the different transmission quality levels are indicated individually in different messages.

Paragraph 57. A method according to any of Paragraphs 52 to 56, wherein each of the different transmission quality levels are indicated together in the same message.

Paragraph 58. A method according to any of Paragraphs 37 to 57, comprising transmitting a dynamic indication to the communications device, the dynamic indication indicating the association between at least one of the PDSCHs and one of the quality report types.

Paragraph 59. A method according to Paragraph 58, wherein the dynamic indication is comprised within downlink control information, DCI, transmitted to the communications device.

Paragraph 60. A method according to Paragraph 59, wherein the DCI is a downlink grant indicating a set of downlink radio resources of the wireless radio interface within which the at least one of the PDSCHs is to be received by the communications device.

Paragraph 61. A method according to Paragraph 59 or Paragraph 60, wherein the DCI is an activation DCI indicating that a semi-persistent scheduling, SPS, resource instance within which downlink signals may be received by the communications device is activated, the activation DCI therefore indicating that the SPS resource instance is to be used by the communications device for receiving the at least one of the PDSCHs.

Paragraph 62. A method according to any of Paragraphs 59 to 61, wherein the dynamic indication is an identifier of the DCI.

Paragraph 63. A method according to any of Paragraphs 59 to 62, wherein the dynamic indication is indicated by a new field of the DCI, comprising one or more bits, which is specific to the purpose of providing the dynamic indication.

Paragraph 64. A method according to any of Paragraphs 58 to 63, wherein the dynamic indication is comprised within a physical layer priority indicator of a physical uplink control channel, PUCCH, wherein PUCCH is associated with the at least one of the PDSCHs and scheduled for the communications device to transmit feedback for data received via the at least one of the PDSCHs.

Paragraph 65. A method according to any of Paragraphs 58 to 64, wherein the dynamic indication is comprised within a PDSCH group index, wherein the PDSCH group index indicates which of a plurality of groups the at least one of the PDSCHs belongs to.

Paragraph 66. A method according to any of Paragraphs 58 to 65, wherein the dynamic indication is comprised within a feedback timing indicator, wherein the feedback timing indicator indicates uplink radio resources of the wireless radio interface, in which the communications device is to transmit feedback for data transmitted by the infrastructure equipment via the at least one of the PDSCHs, with respect to downlink radio resources of the wireless radio interface in which the at least one of the PDSCHs is received.

Paragraph 67. A method according to any of Paragraphs 37 to 66, comprising transmitting a semi-static indication to the communications device, the semi-static indication indicating the association between each of the PDSCHs and one of the quality report types.

Paragraph 68. A method according to Paragraph 67, wherein the semi-static indication is a radio resource control, RRC, indication transmitted to the communications device.

Paragraph 69. A method according to Paragraph 67 or Paragraph 68, wherein the semi-static indication is a semi-persistent scheduling, SPS, configuration indicated from among a plurality of SPS configurations.

Paragraph 70. A method according to any of Paragraphs 67 to 69, wherein the semi-static indication is an identifier of a hybrid automatic repeat request, HARQ, process from among a plurality of HARQ processes.

Paragraph 71. An infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry to transmit, to the communications device, an indication of one or more physical downlink shared channel, PDSCHs, to be transmitted by the infrastructure equipment to the communications device via the radio access interface, to transmit, to the communications device, an indication of whether the communications device is to report one or more quality report types, wherein each of the quality report types is associated with at least one of the PDSCHs, and to receive, from the communications device, for at least one of the quality report types, an indication of a transmission quality level with which the infrastructure equipment would need to transmit the associated PDSCHs such that the communications device would receive the associated PDSCHs at a target block error rate, BLER.

Paragraph 72. Circuitry for an infrastructure equipment forming part of a wireless communications network configured to transmit signals to and/or to receive signals from a communications device, the infrastructure equipment comprising transceiver circuitry configured to transmit signals and receive signals via a wireless radio interface provided by the infrastructure equipment, and controller circuitry configured in combination with the transceiver circuitry to transmit, to the communications device, an indication of one or more physical downlink shared channel, PDSCHs, to be transmitted by the infrastructure equipment to the communications device via the radio access interface, to transmit, to the communications device, an indication of whether the communications device is to report one or more quality report types, wherein each of the quality report types is associated with at least one of the PDSCHs, and to receive, from the communications device, for at least one of the quality report types, an indication of a transmission quality level with which the infrastructure equipment would need to transmit the associated PDSCHs such that the communications device would receive the associated PDSCHs at a target block error rate, BLER.

Paragraph 73. A telecommunications system comprising a communications device according to Paragraph 35 and an infrastructure equipment according to Paragraph 71.

Paragraph 74. A computer program comprising instructions which, when loaded onto a computer, cause the computer to perform a method according to any of Paragraphs 1 to 34, and Paragraphs 37 to 69.

Paragraph 75. A non-transitory computer-readable storage medium storing a computer program according to Paragraph 74.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] TR 38.913, "Study on Scenarios and Requirements for Next Generation Access Technologies (Release 14)", third Generation Partnership Project, v14.3.0.

[3] RP-190726, "Physical layer enhancements for NR ultra-reliable and low latency communication (URLLC)", Huawei, HiSilicon, RAN #83.

[4] RP-201310, "Revised WID: Enhanced Industrial Internet of Things (IoT) and ultra-reliable and low latency communication (URLLC) support for NR," Nokia, Nokia Shanghai Bell, RAN #88e.

[5] R1-2103956, "Feature lead summary #4 on CSI feedback enhancements for enhanced URLLC/IIoT," Moderator (InterDigital), RAN1 #104e-bis.

[6] European patent application number EP20187799.0.

What is claimed is:

1. A method of operating a communications device configured to transmit signals to and/or to receive signals from a wireless communications network via a wireless radio interface provided by the wireless communications network, the method comprising:

receiving, from the wireless communications network, an indication of one or more physical downlink shared channel, PDSCH, to be received by the communications device from the wireless communications network via the wireless radio interface, receiving, from the wireless communications network, an indication of whether to report one or more quality report types, wherein each of the quality report types is associated with at least one of the one or more PDSCH, receiving data via the indicated one or more PDSCH, determining, for at least one of the quality report types and based on decoding results of the data received via the associated at least one of the one or more PDSCH, a transmission quality level with which the wireless communications network would need to transmit the associated at least one of the one or more PDSCH such that the communications device would receive the associated at least one of the one or more PDSCH at a target block error rate, BLER, determining a difference value between (1) the determined transmission quality level with which the wireless communications network would need to transmit the associated at least one of the one or more PDSCH such that the communications device would receive the associated at least one of the one or more PDSCH at the target BLER and (2) a quality level with which the associated at least one of the one or more PDSCH is scheduled for transmission by the wireless communications network, and transmitting to the wireless communications network, for the at least one quality report type, an indication of the determined transmission quality level including the determined difference value.

2. The method according to claim 1, wherein the associated at least one of the one or more PDSCH is to carry data of a type associated with the target BLER used by the communications device to determine the transmission quality level for the at least one quality report type.

3. The method according to claim 1, wherein the associated at least one of the one or more PDSCH is to carry data of a type associated with a different target BLER to the target BLER used by the communications device to determine the transmission quality level for the at least one quality report type.

4. The method according to claim 1, wherein the indication of the determined transmission quality levels directly indicates the values of the determined transmission quality level.

5. The method according to claim 1, further comprising:

determining transmission quality levels for two or more quality report types, and transmitting the indication of the determined transmission quality levels as a single difference value for all of the two or more quality report types.

6. The method according to claim 1, wherein the transmission quality level is a channel quality indicator, CQI.

7. The method according to claim 1, wherein the transmission quality level is a modulation and coding scheme, MCS.

8. The method according to claim 1, wherein at least one of the quality report types is associated with a plurality of the one or more PDSCH.

9. The method according to claim 8, wherein the plurality of the one or more PDSCH associated with the at least one of the quality report types are those of the one or more PDSCH to be received by the communications device from the wireless communications network that are scheduled to be received by the communications device within a particular time period, wherein the particular time period is associated with the at least one of the quality report types.

10. The method according to claim 8, wherein the transmission quality level indicated for the at least one of the quality report types is the result of a filtering function performed on the determined transmission quality level for each of the plurality of the one or more PDSCH associated with the at least one of the quality report types.

11. The method according to claim 8, wherein the transmission quality level indicated for the at least one of the quality report types is an average of the determined transmission quality level for each of the plurality of the one or more PDSCH associated with the at least one of the quality report types.

12. The method according to claim 8, wherein the transmission quality level indicated for the at least one of the quality report types is a minimum from among the determined transmission quality level for each of the plurality of the one or more PDSCH associated with the at least one of the quality report types.

13. The method according to claim 8, wherein the transmission quality level indicated for the at least one of the quality report types is a maximum from among the determined transmission quality level for each of the plurality of the one or more PDSCH associated with the at least one of the quality report types.

14. The method according to claim 8, wherein the transmission quality level indicated for the at least one of the quality report types is selected from among the determined transmission quality level for each of the plurality of the one or more PDSCH associated with the at least one of the quality report types on the basis of the selected transmission quality level being at a specified percentile rank from among the determined transmission quality levels.

15. The method according to claim 1, wherein the indication of the determined transmission quality level comprises the transmission of one or more indications which between them indicate a plurality of different determined transmission quality levels.

16. The method according to claim 15, wherein the received indication of the one or more quality report types comprises an indication of a plurality of different target BLERs to be used by the communications device to determine the transmission quality levels, wherein each of the different target BLERs is associated with one of the different determined transmission quality levels.

17. The method according to claim 1, further comprising determining the association between at least one of the one or more PDSCH and one of the quality report types based on a dynamic indication received from the wireless communications network.

18. The method according to claim 1, further comprising determining the association between each of the PDSCH and one of the quality report types based on a semi-static indication received from the wireless communications network.

19. An infrastructure equipment forming part of a wireless communications network configured to transmit signals to and/or to receive signals from a communications device, the infrastructure equipment comprising:

transceiver circuitry configured to transmit signals and receive signals via a wireless radio interface provided by the infrastructure equipment, and controller circuitry configured in combination with the transceiver circuitry to transmit, to the communications device, an indication of one or more physical downlink shared channel, PDSCH, to be transmitted by the infrastructure equipment to the communications device via the wireless radio interface, to transmit, to the communications device, an indication of whether the communications device is to report one or more quality report types, wherein each of the quality report types is associated with at least one of the one or more PDSCH, to transmit data via the indicated one or more PDSCH, and to receive, from the communications device, for at least one of the quality report types, an indication of a transmission quality level determined based on decoding results of the data transmitted via the associated at least one of the one or more PDSCH and with which the infrastructure equipment would need to transmit the associated at least one of the one or more PDSCH such that the communications device would receive the associated at least one of the one or more PDSCH at a target block error rate, BLER, the indication including a difference value between (1) the transmission quality level with which the infrastructure equipment would need to transmit the associated at least one of the one or more PDSCH such that the communications device would receive the associated at least one of the one or more PDSCH at the target BLER and (2) a quality level with which the associated at least one of the one or more PDSCH is scheduled for transmission by the infrastructure equipment.

* * * * *